US010489733B2

(12) United States Patent
Raack

(10) Patent No.: US 10,489,733 B2
(45) Date of Patent: Nov. 26, 2019

(54) SYSTEMS AND METHODS FOR CENTRALIZED ONLINE CONTEST MANAGEMENT AND VIDEO SHARING

(71) Applicant: Votocast, Inc., Newport Beach, CA (US)

(72) Inventor: Steven Raack, Newport Beach, CA (US)

(73) Assignee: Votocast, Inc., Newport Beach, CA (US)

( * ) Notice: Subject to any disclaimer, the term of this patent is extended or adjusted under 35 U.S.C. 154(b) by 55 days.

(21) Appl. No.: 15/162,530

(22) Filed: May 23, 2016

(65) Prior Publication Data

US 2016/0342913 A1 Nov. 24, 2016

Related U.S. Application Data

(60) Provisional application No. 62/165,128, filed on May 21, 2015.

(51) Int. Cl.
*G06Q 10/06* (2012.01)
*G06F 16/78* (2019.01)
*G06F 16/2457* (2019.01)
*G06Q 50/00* (2012.01)

(52) U.S. Cl.
CPC ... *G06Q 10/0637* (2013.01); *G06F 16/24578* (2019.01); *G06F 16/7867* (2019.01); *G06Q 50/01* (2013.01)

(58) Field of Classification Search
CPC ............... G06Q 10/0637; G06Q 50/01; G06F 16/7867; G06F 16/24578

USPC ....................................................... 705/7.36
See application file for complete search history.

(56) References Cited

U.S. PATENT DOCUMENTS

| | | | |
|---|---|---|---|
| 7,162,433 B1 * | 1/2007 | Foroutan | G06Q 10/063114 705/7.42 |
| 8,162,758 B1 * | 4/2012 | Powers | H04N 21/2743 463/42 |
| 8,700,714 B1 | 4/2014 | Pan et al. | |
| 2007/0244749 A1 * | 10/2007 | Speiser | G06Q 30/0212 705/14.14 |

(Continued)

OTHER PUBLICATIONS

Kodak Launches Online Contest Seeking Knockout Moments Business Wire Jan. 31, 2008: NA.*

(Continued)

*Primary Examiner* — Timothy Padot
(74) *Attorney, Agent, or Firm* — Sheppard, Mullin, Richter & Hampton LLP

(57) ABSTRACT

Systems and methods for centralized contest management are disclosed. In some embodiments, a computerized method comprises storing first videos associated with a first contest related to a first sponsor system, and second videos associated with a second contest related to a second sponsor system. Requests for videos may be received from the sponsor systems, and the corresponding videos may be provided to the sponsor systems for display on participant systems. Participant feedback associated with the videos may be received from the sponsor systems, and the videos may be scored based at least partially on the participant feedback. Winners of the respective contests may be determined, and the respective related sponsor system may be notified.

19 Claims, 12 Drawing Sheets

(56) References Cited

U.S. PATENT DOCUMENTS

| | | | |
|---|---|---|---|
| 2012/0157177 A1* | 6/2012 | Hughes | G06Q 30/02 463/9 |
| 2013/0079149 A1 | 3/2013 | Fletcher et al. | |
| 2014/0006415 A1 | 1/2014 | Rubchinsky | |
| 2014/0278914 A1* | 9/2014 | Gurumoorthy | G06Q 30/0243 705/14.42 |
| 2015/0209677 A1* | 7/2015 | O'Brien | A63F 13/792 463/25 |

OTHER PUBLICATIONS

International Application No. PCT/US2016/033834, International Search Report and Written Opinion dated Aug. 22, 2016.

* cited by examiner

SYSTEMS AND METHODS FOR CENTRALIZED ONLINE CONTEST MANAGEMENT AND VIDEO SHARING

CROSS-REFERENCE TO RELATED APPLICATIONS

The present application claims the benefit of U.S. Provisional Patent Application Ser. No. 62/165,128 filed May 21, 2015 and entitled "Systems and Methods for Creative Competition Using Video Sharing Gamification," the entirety of which is incorporated herein by reference.

BACKGROUND

Technical Field

Embodiments of the present invention relate generally to the field of online contests. More specifically, embodiments of the present inventions relate to centralized online contest management and video sharing.

Description of Related Art

Online contests may increase sponsor awareness, which may lead to increased revenue for sponsors (e.g., COCA-COLA). Typically, sponsors provide online contests through a variety of different web sites and applications, such as Twitter and Facebook. However, while providing online contests in such a manner may increase sponsor awareness without requiring the sponsor to provide additional computing resources, it may fail to increase user engagement with the sponsor.

SUMMARY

Generally, online contests (or, "contests") may promote sponsor awareness, but they often fail to increase engagement levels between participant systems and sponsor systems. For example, participant systems are typically redirected to other sites (e.g., to Facebook or Twitter) in order to participate in a contest. As a result, the contests often increase engagement levels with those other sites, rather than the sponsor systems.

Some embodiments described herein include systems and methods for centralized online contest management and video sharing. Generally, a contest management system may operate contests for a sponsor system. For example, the contest management system may create contests for a sponsor system, and maintain the associated contest data required to operate the contest. However, the sponsor system may nonetheless provide the contest data to the participant systems using their own systems (e.g., a web server, application server, or the like). For example, the sponsor systems may retrieve the contest data from the contest management system as needed (or, "on-demand"), rather than having to maintain the contest data themselves or redirect the participant systems to a different site. This may help, for example, increase an engagement level between the participant systems and the sponsor system, while also reducing a computing load of the sponsor system. In some embodiments, the contest management system may also simultaneously operate contests for different sponsor systems effectively operating as a contest "clearinghouse."

In various embodiments, a computerized method comprises storing first videos associated with a first contest related to a first sponsor system, and second videos associated with a second contest related to a second sponsor system. Requests for videos may be received from the sponsor systems, and the corresponding videos may be provided to the sponsor systems for display on participant systems. Participant feedback associated with the videos may be received from the sponsor systems, and the videos may be scored based at least partially on the participant feedback. Winners of the respective contests may be determined, and the respective related sponsor system may be notified.

In some embodiments, the first sponsor system and the second sponsor system comprise different computing systems operating at different network sites.

In some embodiments, the first participant system and the second participant system comprise different computing systems operating at different network sites.

In some embodiments, the first participant feedback comprises first participant feedback generated by a third participant system.

In some embodiments, the second participant feedback comprises second participant feedback generated by a fourth participant system.

In some embodiments, the method further comprises determining, by the contest management system, a third participant system associated with the first winner; and providing, by the contest management system, a first notification to the third participant system, the first notification indicating a first result of the first contest. In related embodiments, the method further comprises determining, by the contest management system, a fourth participant system associated with the second winner; and providing, by the contest management system, a second notification to the fourth participant system, the second notification indicating a second result of the second contest.

In some embodiments, the providing the at least one of the first plurality of videos to the first sponsor system for display to the first participant system comprises streaming the at least one of the first plurality of videos to the first sponsor system for display to the first participant system. In related embodiments, the providing the at least one of the second plurality of videos to the second sponsor system for display to the second participant system comprises streaming the at least one of the second plurality of videos to the second sponsor system for display to the second participant system streaming.

In various embodiments, a system comprises a contest video datastore configured to cooperate with a processor to store a first plurality of videos associated with a first contest related to a first sponsor system, and a second plurality of videos associated with a second contest related to a second sponsor system. A contest processing module may be configured to cooperate with the processor to receive a first video request for at least one of the first plurality of videos, the first video request being received from the first sponsor system; receive a second video request for at least one of the second plurality of videos, the second video request being received from the second sponsor system; provide the at least one of the first plurality of videos to the first sponsor system for display to a first participant system; provide the at least one of the second plurality of videos to the second sponsor system for display to a second participant system; receive a first participant feedback associated with the at least one of the first plurality of videos, the first participant feedback being received from the first sponsor system; receive a second participant feedback associated with the at least one of the second plurality of videos, the second participant feedback being received from the second sponsor system; score the at least one of the first plurality of videos based at least partially on the first participant feedback; score the at least one of the second plurality of videos based at least partially on the second participant feedback; determine a first winner of the first contest based at least partially on the scoring of the at least one of the first plurality of videos; determine a second winner of the second contest based at least partially on the scoring of the at least one of the second plurality of videos; notify the first sponsor system of the first winner; and notify the second sponsor system of the second winner.

In some embodiments, the first sponsor system and the second sponsor system comprise different computing systems operating at different network sites.

In some embodiments, the first participant system and the second participant system comprise different computing systems operating at different network sites.

In some embodiments, the first participant feedback comprises first participant feedback generated by a third participant system. In related embodiments, the second participant feedback comprises second participant feedback generated by a fourth participant system.

In some embodiments, the contest processing module determines a third participant system associated with the first winner, and provides a first notification to the third participant system, the first notification indicating a first result of the first contest. In related embodiments, the contest processing module determines a fourth participant system associated with the second winner, and provides a second notification to the fourth participant system, the second notification indicating a second result of the second contest.

In some embodiments, the providing the at least one of the first plurality of videos to the first sponsor system for display to the first participant system comprises streaming the at least one of the first plurality of videos to the first sponsor system for display to the first participant system. In related embodiments, the providing the at least one of the second plurality of videos to the second sponsor system for display to the second participant system comprises streaming the at least one of the second plurality of videos to the second sponsor system for display to the second participant system streaming.

In various embodiments, a non-transitory computer readable medium comprises executable instructions, the instructions being executable by a processor to perform a method, the method comprising: storing a first plurality of videos associated with a first contest related to a first sponsor system, and a second plurality of videos associated with a second contest related to a second sponsor system; receiving a first video request for at least one of the first plurality of videos, the first video request being received from the first sponsor system; receiving a second video request for at least one of the second plurality of videos, the second video request being received from the second sponsor system; providing the at least one of the first plurality of videos to the first sponsor system for display to a first participant system; providing the at least one of the second plurality of videos to the second sponsor system for display to a second participant system; receiving a first participant feedback associated with the at least one of the first plurality of videos, the first participant feedback being received from the first sponsor system; receiving a second participant feedback associated with the at least one of the second plurality of videos, the second participant feedback being received from the second sponsor system; scoring the at least one of the first plurality of videos based at least partially on the first participant feedback; scoring the at least one of the second plurality of videos based at least partially on the second participant feedback; determining a first winner of the first contest based at least partially on the scoring of the at least one of the first plurality of videos; determining a second winner of the second contest based at least partially on the scoring of the at least one of the second plurality of videos; notifying the first sponsor system of the first winner; and notifying the second sponsor system of the second winner.

DETAILED DESCRIPTION

Generally, online contests (or, "contests") may promote sponsor awareness, but they often fail to increase engagement levels between participant systems and sponsor systems. For example, participant systems are typically redirected to other sites (e.g., to Facebook or Twitter) in order to participate in a contest. As a result, the contests often increase engagement levels with those other sites, rather than the sponsor systems.

Some embodiments described herein include systems and methods for centralized online contest management and video sharing. Generally, a contest management system may operate contests for a sponsor system. For example, the contest management system may create contests for a sponsor system, and maintain the associated contest data required to operate the contest. However, the sponsor system may nonetheless provide the contest data to the participant systems using their own systems (e.g., a web server, application server, or the like). For example, the sponsor systems may retrieve the contest data from the contest management system as needed (or, "on-demand"), rather than having to maintain the contest data themselves or redirect the participant systems to a different site. This may help, for example, increase an engagement level between the participant systems and the sponsor system, while also reducing a computing load of the sponsor system. In some embodiments, the contest management system may also simultaneously operate contests for different sponsor systems, effectively operating as a contest "clearinghouse."

Figure 1:
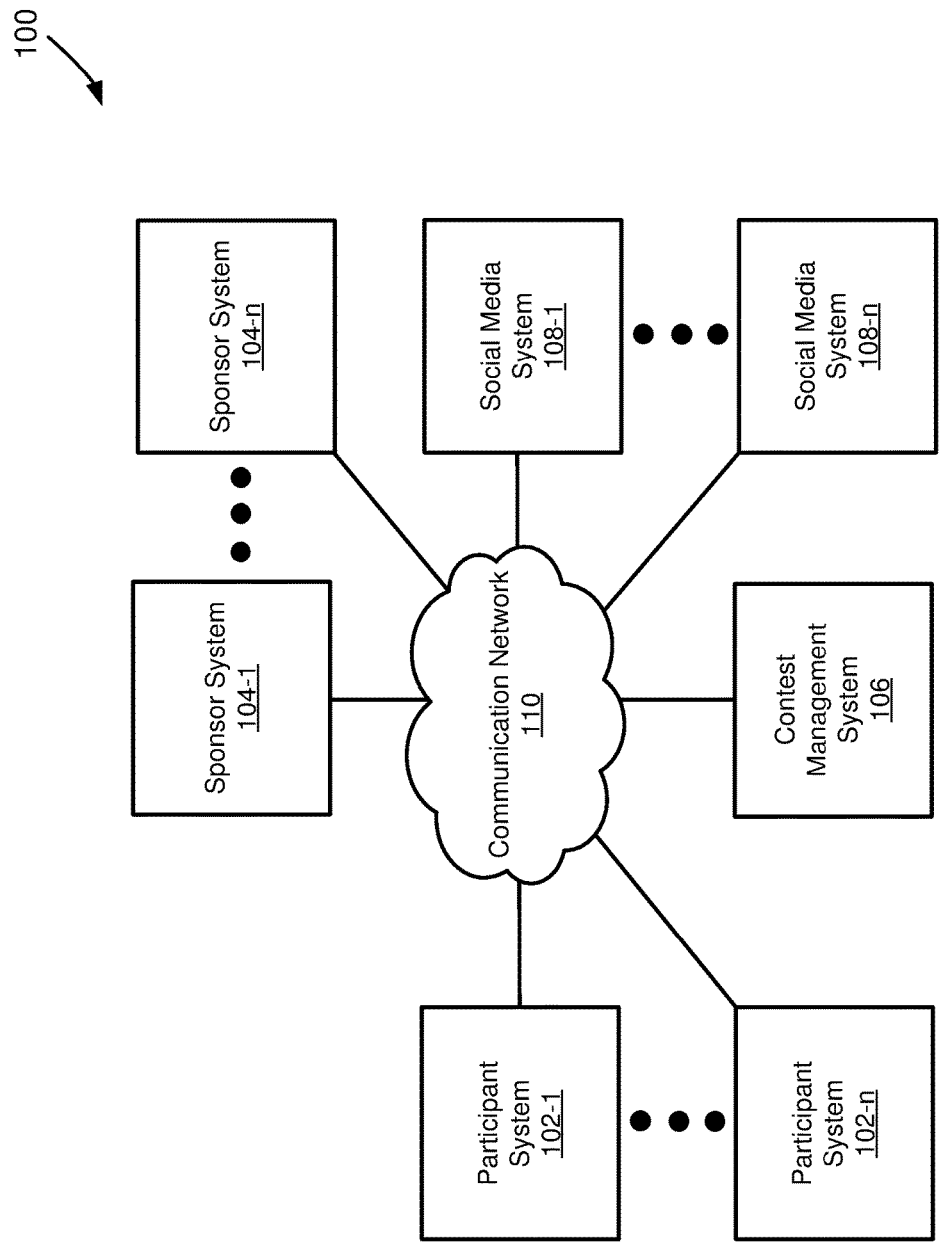
FIG. 1 depicts a block diagram of an example system capable of providing centralized online contest management and video sharing according to some embodiments.

FIG. 1 depicts a block diagram of an example system 100 capable of providing centralized online contest management and video sharing according to some embodiments. The system 100 includes participant systems 102-1 to 102-n (individually, the participant system 102, collectively, the participant systems 102), sponsor systems 104-1 to 104-n (individually, the sponsor system 104, collectively, the sponsor systems 104), a contest management system 106, social media systems 108-1 to 108-n (individually, the social media system 108, collectively, the social media systems 108), and a communications network 110.

The participant systems 102 may be configured to display, or otherwise present, contest data. For example, the functionality of the participant systems 102 may be performed by one or more mobile devices (e.g., smartphone, cell phone, smartwatch, tablet computer, or the like), desktop computers, laptop computers, and the like. In various embodiments, contest data may include a contest identifier (e.g., contest names), a contest sponsor (e.g., COCA-COLA), a contest description (or, "theme"), videos associated with a contest (or, "contest videos"), contest rankings, contest notifications, and the like. For example, contest rankings may comprise a "leaderboard," and contest notifications may include notifications (or, "alerts") related to contest results, a change in contest rankings, contest awards, and account login or registration.

In some embodiments, the participant systems 102 are configured to generate (or, "produce") and provide contest videos. For example, a particular contest may request that participants submit contest videos related to the contest's theme (e.g., "COACHELLA 2016"). The participant system 102 may be able capture, edit, and/or otherwise create the contest videos, as well as provide the contest videos for submission to the contest.

In some embodiments, the participant systems 102 are configured to receive and provide participant feedback for contest videos. For example, participant feedback may include an "up vote," "down vote," "like," "dislike," "super like," "super dislike," and so forth.

The sponsor systems 104 may be configured to provide contest data for display by remote systems. For example, the functionality of the sponsor systems 104 may be performed by one or more servers, desktop computers, laptop computers, mobile devices (e.g., smartphone, cell phone, smartwatch, or tablet computer), and the like. In various embodiments, some or all of the contest data is stored remotely. For example, a sponsor system 104 may include a web server associated with the sponsor's domain address (e.g., www.coca-cola.com), and the web server may display contest videos stored on a remote system. In some embodiments, each of the sponsor systems 104 is owned and operated by a different sponsor (e.g., COCA-COLA, LA DODGERS, U2, or the like).

The contest management system 106 may be configured to function as a contest clearinghouse by storing contest data, providing contest data to remote systems, and otherwise maintaining and operating contests for a variety of different sponsors. For example, the functionality of the contest management system 106 may be performed by one or more servers, workstations, desktop computers, laptop computers, mobile devices (e.g., smartphone, cell phone, smartwatch, or tablet computer), and the like.

The social media systems 108 may be configured to provide a variety of different social media platforms and services. For example, the social media systems 108 may include Twitter, Facebook, and the like. In some embodiments, the social media systems 108 are configured to present contest videos, links to contest videos, and/or receive participant feedback associated with contest videos.

In some embodiments, the communication network 110 represents one or more computer networks (e.g., LAN, WAN, or the like). The communication network 100 may provide communication between any of the participant systems 102, the sponsor system 104, the contest management system 106, and the social media systems 108. In some implementations, the communication network 110 comprises computing devices, routers, cables, buses, and/or other network topologies. In some embodiments, the communications network 110 may be wired and/or wireless. In various embodiments, the communications network 110 may comprise the Internet, one or more networks that may be public, private, IP-based, non-IP based, and so forth.

Figure 2A:
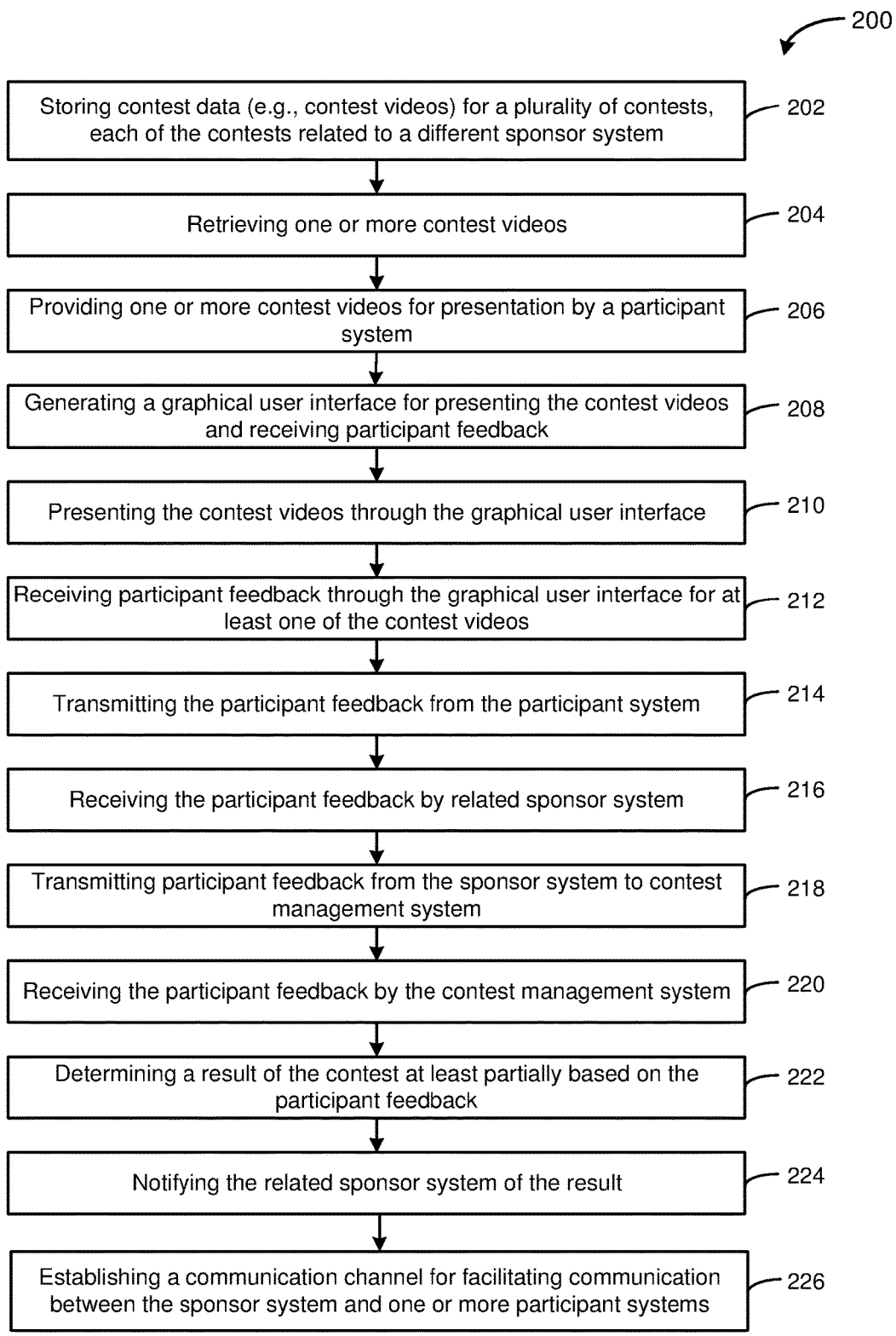
FIGS. 2A-B depict flowcharts of example methods of operation of a system capable of providing centralized online contest management and video sharing according to some embodiments.

FIG. 2A depicts a flowchart 200 of an example method of operation of a system capable of providing centralized online contest management and video sharing according to some embodiments. In this and other flowcharts described in this paper, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 202, a contest management system 106 stores contest data for different contests, each of the different contests related to a different sponsor system. Contest data may include videos for the contest, names of participants who created the videos, contact information for the participants who created the videos, scores, feedback, and the like. A contest may include video clips related to a particular sponsor, a particular event (e.g., music festival, and/or a particular topic (e.g., a musician).

In step 204, the contest management system 106 retrieves one or more contest videos. In some embodiments, the one or more contest videos may be retrieved in response to a request from a related sponsor system. For example, the sponsor system 104 may comprise a web server or application (or, "app") server, and the request may have been generated by the web server or application server in response to a participant system 102 navigating to a domain associated with the web server or application server. The contest management system 106 may retrieve contest videos from local storage, remote storage (e.g., from a cloud storage device), or both.

In step 206, a sponsor system 104 associated with the one or more contest videos provides the one or more contest videos for presentation by participant system 102. For example, the sponsor system 104 may provide the one or more contest videos via a web server or a mobile application server. The sponsor system 104 may receive one or more video clips from the contest management system 106 or receive the one or more video clips at the direction of the contest management system 106. The sponsor system 104 may display, provide, stream, or download the video to a participant (e.g., to a participant system 102). In one example, the sponsor system 104 may provide an interface for a participant system 102 to select one or more videos related to a contest. The participant system 102 may select one or more videos using the interface and provide a video request to the sponsor system 104. The sponsor system 104 may provide the video request to the contest management system 106 which may then provide the requested video(s) to the sponsor system 104 for display, stream, or download by the sponsor system 104 to the participant system 102.

In step 208, a participant system 102 generates a graphical user interface (GUI) for presenting contest videos and receiving participant feedback. For example, the GUI may comprise a web browser and/or a mobile application client. In step 210, the participant system 102 presents the one or more contest videos through the GUI. In step 212, the participant system 102 receives participant feedback for at least at least one or the presented contest videos. In step 214, the participant system 102 transmits the participant feedback.

In step 216, the sponsor system 104 receives the participant feedback. In step 218, the sponsor system 104 transmits the participant feedback to the contest management system 106.

In step 220, the contest management system 106 receives the participant feedback. In step 222, the contest management system 106 determines one or more winners of the contest based at least partially on the participant feedback. In step 224, the contest management system 106 notifies the corresponding sponsor system 104 of the winner. For example, the contest management system 106 may transmit a data message including the contest winner's name, account information, contact information, and the like. In some embodiments, participant system 102 information is stored anonymously on the contest management system 106 (or, "anonymized"), and the data message may include anonymized data which the sponsor may use to contact the participant system 102.

In step 226, a private communication channel is established with a participant system 102 of the contest winner for facilitating private communication with the sponsor system 104. The private communication channel may allow, for example, the sponsor system 104 to communicate with winners, or other participant systems 102, regarding offers, promotions, and the like. This may help, for example, increase engagement levels between participant systems 102 and sponsor systems 104. In some embodiments, the channel may be established by the sponsor system 104. In other embodiments, the channel may be established by the contest management system 106.

Figure 2B:
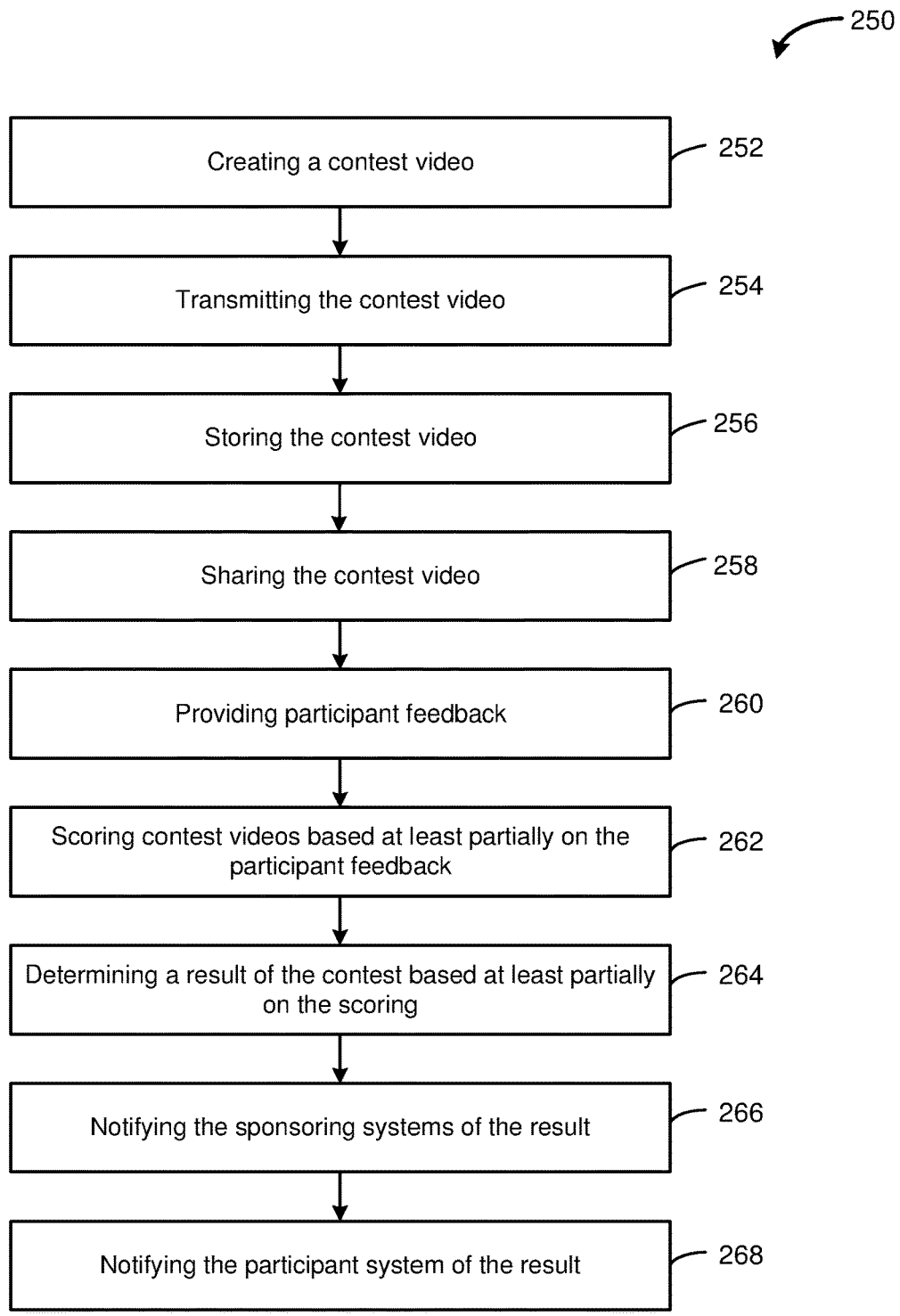

FIG. 2B depicts a flowchart 250 of an example method of operation of a system capable of providing centralized online contest management and video sharing according to some embodiments.

In step 252, a participant system 102 creates a contest video. For example, the participant system 102 may create a video (e.g., a video clip) and link it with a contest (e.g., via a hashtag or other indicator associated with a contest). In step 254, the participant system 102 transmits the contest video to a contest management system 106 (e.g., using an application on the participant system 102 or using a web browser). For example, the participant system 102 may transmit the contest video to a sponsor system 104 of the contest, and the sponsor system 104 may transmit the contest video to the contest management system 106. Alternatively, the participant system 102 may transmit the contest video directly to the contest management system 106. In step 256, the contest management system 106 stores the contest video.

In step 258, the contest management system 106 optionally shares the contest video with one or more remote social media systems in response to a request from the participant system 102. For example, the one or more remote systems may comprise social media systems, such as Facebook or Twitter. In some embodiments, the contest management system 106 may transmit the contest video to the one or more remote systems, or provide a link to the contest video stored on the contest management system 106 or other system (e.g., a temporary, or "on-demand," system provided by the sponsor system 104 or contest management system 106).

In step 260, one or more other participant systems 102 provide participant feedback for the contest video. In some embodiments, members of the social media systems may view contest videos on the remote social media systems and/or provide participant feedback via the remote social media systems without logging in to the contest management system 106, or otherwise participating in the contest.

In step 262, the contest management system 106 scores the contest based at least partially on the participant feedback. In step 264, the contest management system 106 determines one or more contest results (e.g., rankings, winners, or the like). In step 266, the contest management system 106 notifies the sponsor system 104 related to the contest of some or all of the results (e.g., the contest winners). In step 268, the sponsor system 104 notifies the participant system 102 of the contest result (e.g., a win notification indicating one or more winning videos, indicating one or more winning participants, or both). In other embodiments, the contest management system 106 directly notifies the participant system 102.

Figure 3:
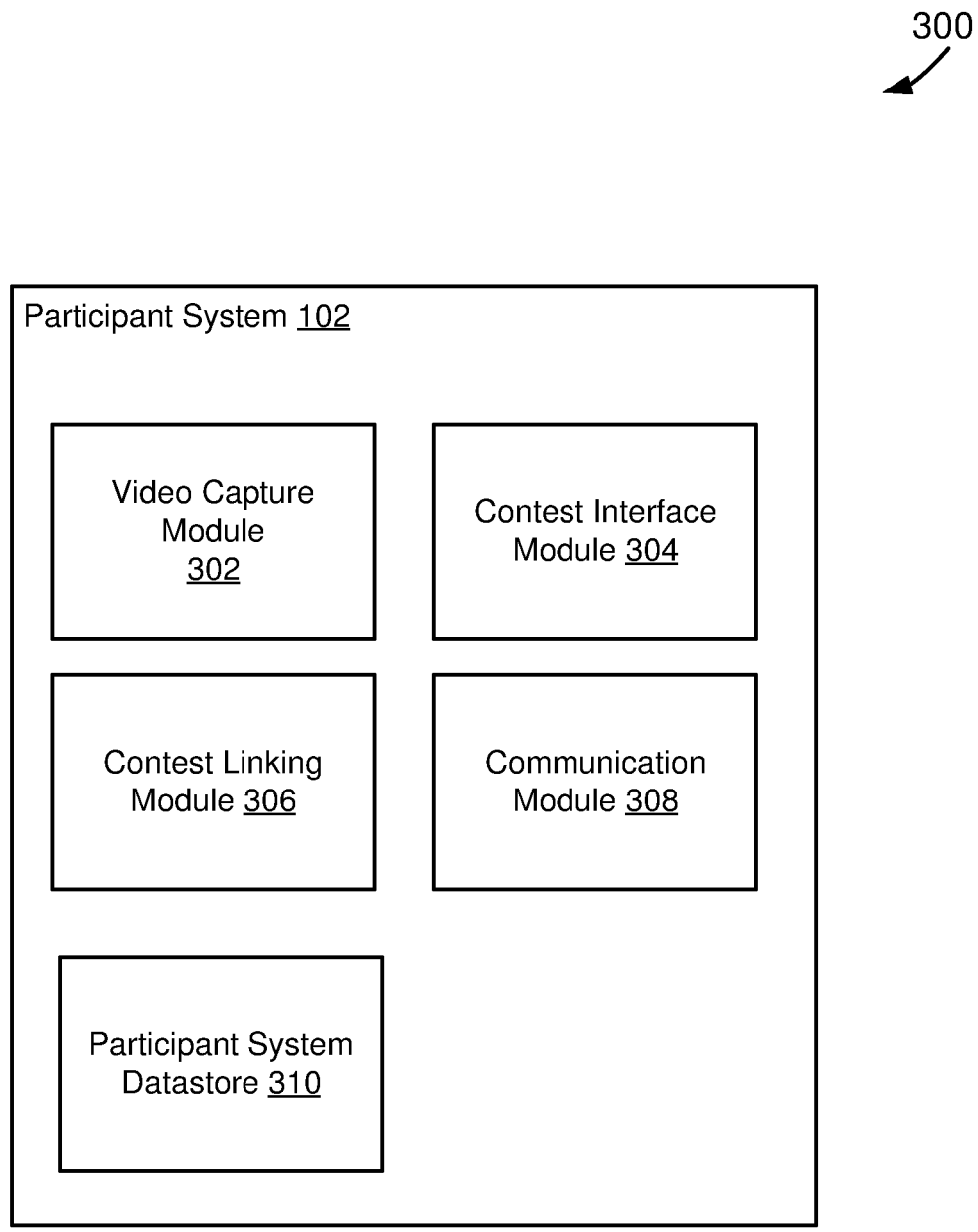
FIG. 3 depicts a block diagram of an example participant system according to some embodiments.

FIG. 3 depicts a block diagram 300 of an example participant system 102 according to some embodiments. In some embodiments, the participant system 102 is configured to create videos, link videos to a contest to create contest videos, present contest videos and other contest data, receive participant feedback, and communicate data. The participant system 102 includes a video capture module 302, a contest interface module 304, a contest linking module 306, a communication module 308, and a participant system datastore 310.

The video capture module 302 may be configured to record, edit, and/or otherwise capture video (e.g., copy and edit a preexisting video). For example, the video capture module 302 may utilize one or more sensors (e.g., cameras, microphones, or the like) associated with the participant system 102 to record video, edit preexisting video (e.g., adding a voiceover, soundtrack, overlaying images, or the like), or both. In some embodiments, the video capture module 302 may be configured to crop video. In some embodiments, captured content is stored, at least temporarily (e.g., for transmission to one or more other systems), in the participant system datastore 310. It will be appreciated that video may include audio data in addition to image data.

The contest interface module 304 may be configured to present contest videos and other contest data, receive participant feedback and other input, search for contest data (e.g., contests, contest videos, other producers or participant systems 102, sponsor systems 104, or the like), and edit video (e.g., crop, add filters, or the like). In some embodiments, the contest interface module 304 may include a web browser or may use a web browser to display an interface to receive a contest video, edit a contest video, capture a video for a contest, receive feedback, or the like. In some embodiments, the contest interface module 304 may comprise a contest mobile application (or, "mobile app") configured to interact with a variety of different of different sponsors and contests. In various embodiments, the contest interface module 304 may comprise the contest mobile application in addition to the web browser. For example, participants may interact with the web browser to view contest data, and seamlessly transition to the mobile app and view the same and/or additional contest data.

In some embodiments, different participant systems 102 may have different configurations and still have the same or similar contest interface 304 functionality. For example, a participant system 102 may use a web browser configuration to view contest videos, upload contest videos, share contest videos, provide participant feedback, and the like. Meanwhile, different participant systems 102 may use mobile app configurations to view the contest videos uploaded by the other participant system, provide participant feedback for the uploaded videos, and so forth. In other embodiments, certain types of contest data and/or features may be exclusive to various configurations (e.g., a mobile app configuration or a web browser).

It will be appreciated that a contest, contest videos, or both may be accessible on many different platforms, websites, or both. For example, a sponsor system 104 may create a contest (e.g., using the contest management system 106). Contest videos may be, in some embodiments, uploaded to be a part of the contest by the participant system 102 using functionality on the sponsor system 104. Alternately or additionally, contest videos may be uploaded to be a part of the contest by the participant system 102 using an application on the participant system 102. The contest video may be viewable using the sponsor system 104 (e.g., which may retrieve the video from the contest management system 106), the application on the participant system 102, or both. In various embodiments, any number of the contest videos may be available through many different platforms (e.g., different digital devices using one or more different operating systems) through applications, browsers (e.g., through the sponsor system 104, social media system 108, or the like), or both.

In various embodiments, the application on the participant system 102 may share the same or different functionality as the sponsor system 104. For example, users may, in some embodiments, use both the application and the sponsor system 104 to upload contest videos, view contest videos, find new contest videos, play contest videos, provide feedback, view a leaderboard, log into an account with the contest management system 106, or the like. Alternately, one or more of the previously identified functions may be only available on the application of the participant system 102 or the sponsor system 104, but not both.

In various embodiments, some functionality may be on the application or the sponsor system 104 but not both. For example, the application on the participant system 102 may allow a participant to search for a variety of contest videos in different contests but the sponsor system 104 may not have that functionality. In another example, the application may allow a participant to view more information regarding contest videos, edit contest videos, and the like while the sponsor system 104 may not perform those functions. Alternately, the sponsor system 104 may allow the participant to engage with other aspects of the video contest (e.g., access to content, coupons, or the like) in exchange for participating in the contest while the application on the participant system 102 may not provide the same access or options.

In other embodiments, the contest interface module 304 may comprise a custom application configured to interact with a specific sponsor. In some embodiments, the content interface module 304 may be configured to cooperate with one or more other modules of the participant system 102 (e.g., communication module 308) to perform some or all of the functionality of the contest interface module 304, although in other embodiments, the contest interface module 304 may include such functionality.

In various embodiments, the contest mobile application may provide an interface that allows a participant (e.g., user of the participant system 102) to browse through contests, contest videos, or both. For example, the contest mobile application may provide a list of contests, contest sponsors, or both. A participant may select one of the contests or contest sponsors to view or select one or more contest videos related to that selection. The participant may provide one or more videos for the contests or contest sponsors, provide feedback for one or more contest videos related to a contest or contest sponsor, or both.

The contest linking module 306 may be configured to create contest videos by linking a video with a particular contest. For example, a video may be linked to a contest based on participant systems input (e.g., a prefix of the video name, such as a hashtag). In some embodiments, the linking may occur automatically. For example, a participant system 102 may be able to provide (e.g., "upload") a video directly to a contest through a sponsor system 104 website or portion of a mobile application, and the linking module 306 may be able to link the video and the contest based on the upload. In some embodiments, a contest video may be linked with only one contest, although other embodiments may allow a video to be linked with multiple contests and/or sponsor systems 104.

The communication module 308 may be configured to send requests, feedback, or both to and receive data from one or a plurality of systems. The communication module 308 may send requests to and receive data from a system through a network or a portion of a network. Depending upon implementation-specific or other considerations, the communication module 308 may send requests and receive data through a connection, all or a portion of which may be a wireless connection. The communication module 308 may request and receive messages, and/or other communications from associated systems. Received data may be stored in the datastore 310. In some embodiments, functionality of the communication module 308 may be included in one or more other modules of the participant system 102 (e.g., the contest interface module 304, contest linking module 306, or the like).

The participant system datastore 310 may further be configured as buffer or cache. For example, the datastore 310 may store video, contest data, participant feedback and/or other input, communications received from other systems, data to be transmitted to other systems, and the like.

Figure 4:
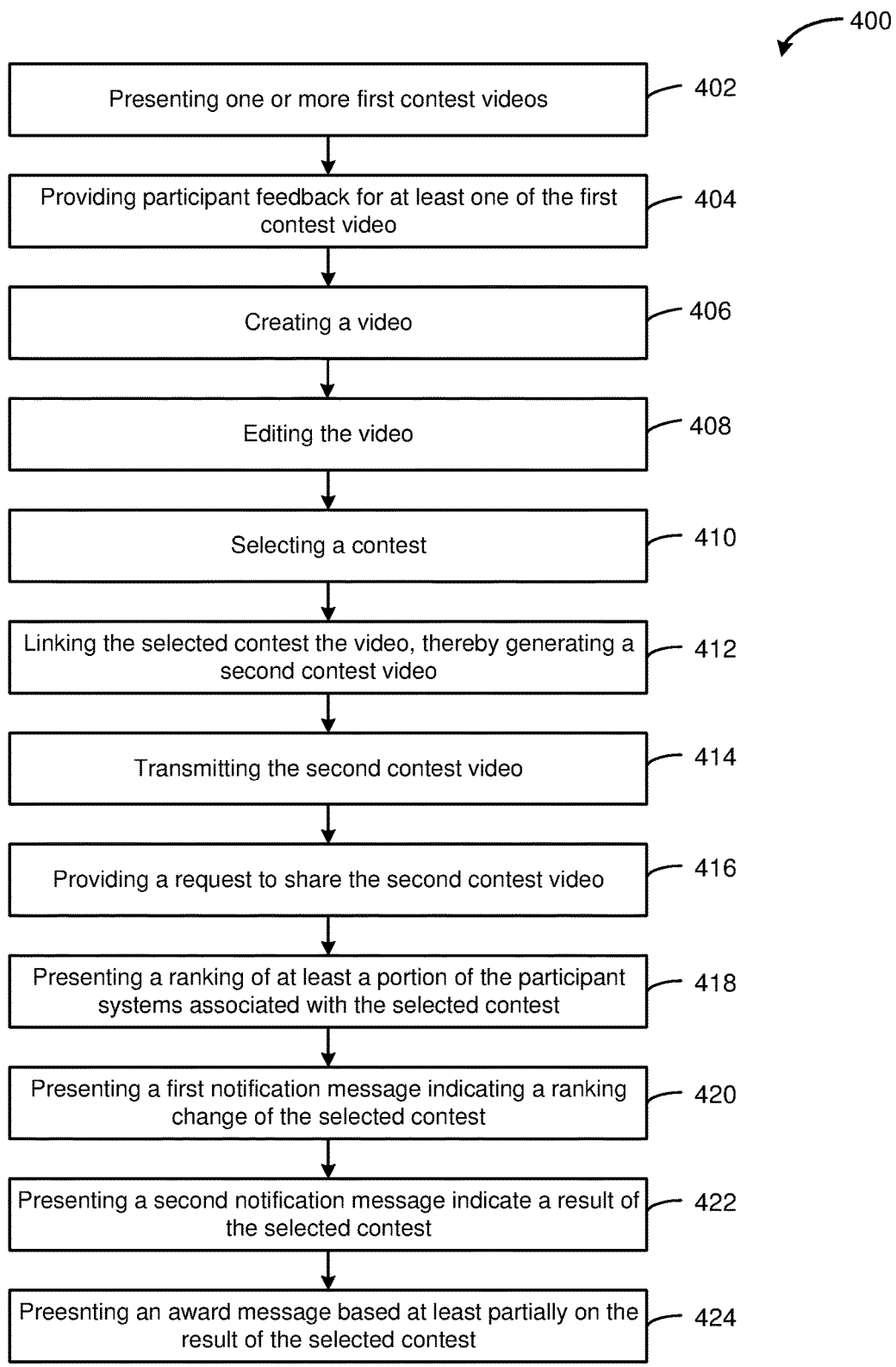
FIG. 4 depicts a flowchart of an example method of operation of a participant system according to some embodiments.

FIG. 4 depicts a flowchart 400 of an example method of operation of a participant system 102 according to some embodiments.

In step 402, a participant system 102 presents one or more first contest videos (e.g., displays one or more first contest videos to the participant). In some embodiments, a contest interface module presents the one or more first contest videos.

In step 404, the participant system 102 provides participant feedback associated with at least one of the one or more first contest videos. In some embodiments, the participant feedback is provided by the contest interface module. Feedback may include a vote, score, "like", "thumbs-up", "thumbs-down", a value related to how much the participant enjoyed the video, or the like.

In step 406, the participant system 102 creates a video. In some embodiments, a video capture module creates the video. In step 408, the participant system 102 optionally edits the video (e.g., adds content, crops video, adds music, adds text, combines with other videos, or a combination of the like). In some embodiments, the video capture module and/or the contest interface module edits the video.

In step 410, the participant system 102 selects a contest. In some embodiments, the contest interface module selects the contest. For example, the participant system 102 may search for a particular contest using the contest interface module and the select the contest from the search results.

In step 412, the participant system 102 links the contest video and the selected contest, thereby generating a second contest video. In some embodiments, a contest linking module may generate the second contest video.

In step 414, the participant system 102 transmits the second contest video. In some embodiments, the contest interface module transmits the second contest video.

In step 416, the participant system 102 provides a request to share the second contest video. In some embodiments, the contest interface module provides the share request.

In step 418, the participant system 102 presents a ranking of at least a portion of the participant systems associated with the contest. For example, the ranking may comprise a leaderboard. In some embodiments, the contest interface module presents the ranking.

In step 420, the participant system 102 presents a first notification (or, "alert") message indicating a ranking change of the participant system 102. In some embodiments the contest interface module presents the first notification. For example, the participant system 102 may notify a participant if a video the participant has an interest in (e.g., the participant received a vote indicating that the user liked the particular video or the participant created the video) is ranked, moves up the leaderboard, moves down the leaderboard, receives a number of votes equal to or greater than a predetermined threshold, or the like.

In step 422, the participant system 102 presents a second notification message indicating a result of the contest. In some embodiments the contest interface module presents the second notification.

In step 424, the participant system 102 presents an award based at least partially on the result of the contest. In some embodiments the contest interface module presents the award. The award may be anything of value. For example, the award may be a virtual trophy or medal (e.g., an icon or picture), a digital code that may be redeemed for one or more tickets, items from a store, access to digital information, access to an event (e.g., backstage passes), coupons, discounts, audio, a video, or the like.

Figure 5:
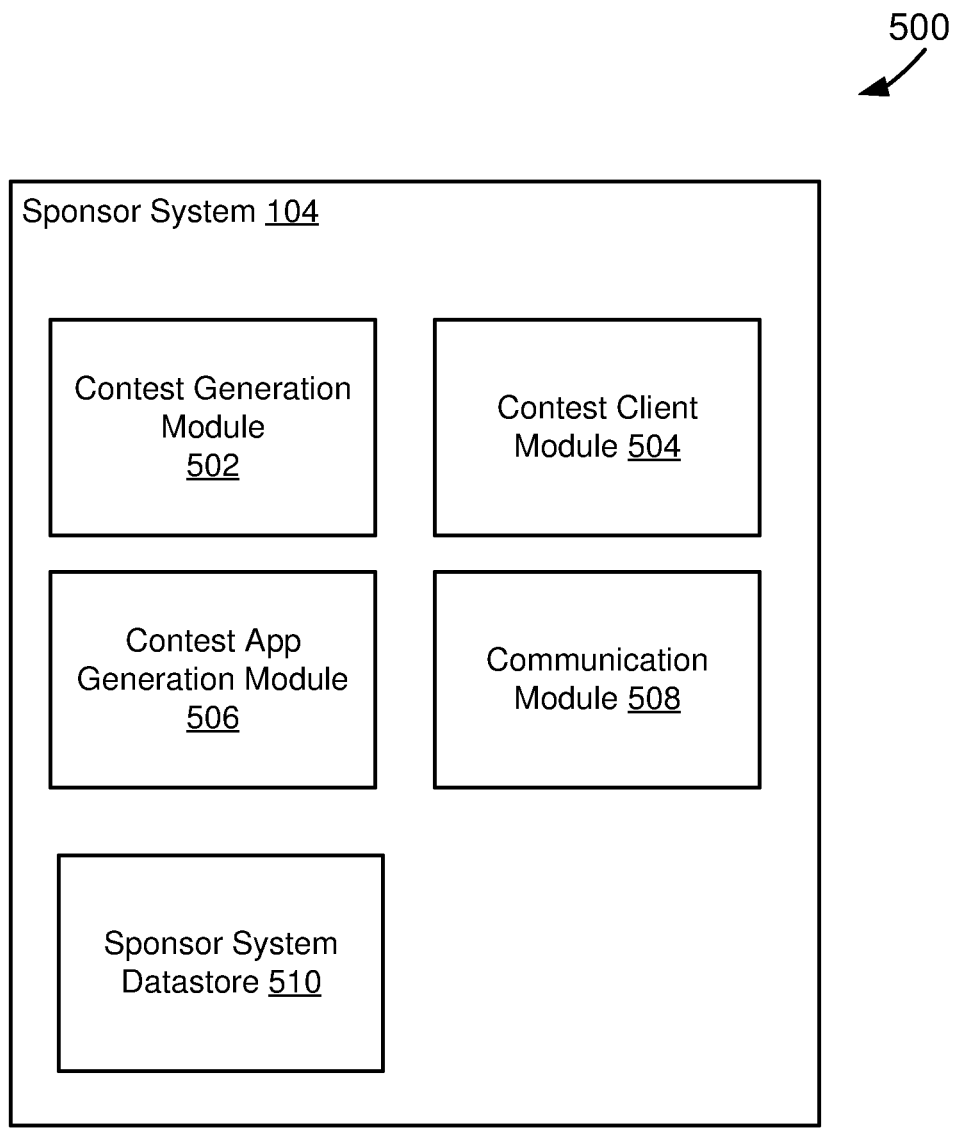
FIG. 5 depicts a block diagram of an example sponsor system according to some embodiments.

FIG. 5 depicts a block diagram 500 of an example sponsor system 104 according to some embodiments. In some embodiments, the sponsor system 104 is configured to provide contest video for presentation by remote systems, request new contests, receive contest requests, and provide (or, "forward") contest requests. In some embodiments, the contest video may be stored, and otherwise managed, by a remote system, and the sponsor system 104 may have limited access to the remote system. The sponsor system 104 includes a contest generation module 502, a contest client module 504, a contest application generation module 506, a communication module 508, and a sponsor system datastore 510.

In various embodiments, the contest management system 106 may provide the sponsor system 104 one or more of the following: the contest generation module 502, a contest client module 504, a contest application generation module 506, a communication module 508, and a sponsor system datastore 510. In some embodiments, the contest management system 106 provides different sponsor systems 104 with one or more different contest generation modules 502, contest client modules 504, contest application generation modules 506, communication modules 508, and sponsor system datastores 510. The contest management system 106 may provide any number of software modules to any number of different sponsor systems 104 to enable the sponsor systems 104 to display contest videos and receive feedback thereby allowing the sponsor systems 104 to further engage with potential customers interested in the sponsor. The contest management system 106 provides services and software to any number of sponsor systems 104 such that the sponsor systems 104 may be engaged with the participants without each sponsor designing and coding their own contests, interfaces, leaderboards, leaderboard tracking, video selection, or the like. The contest management system 106 may provide software that enables the sponsor system 104 to appear to be running the contest from the sponsor system 104 but one or more services (e.g., storing contest videos, streaming contest videos, capturing feedback, converting feedback into contest video scores, leaderboard tracking, contest management, notification of winners, browsing of videos, or the like) may be provided by the contest management system 106.

The contest generation module 502 may be configured to generate and transmit requests to create a contest. For example, a request can include a related sponsor system, and contest attributes (e.g., name, description, duration, awards, rules, or the like).

The contest client module 504 may be configured to provide communication with one or more remote systems such as participant systems 102 (e.g., to provide contest videos and other contest data for presentation on remote systems, receive contest requests, provide contest requests, receive notifications, and provide notifications). For example, the contest client module 504 may comprise a web server and/or a mobile application server. In some embodiments, the contest client module 504 may allow, for example, the sponsor system 104 to provide contest data without having to maintain the data. For example, the contest client module 504 may stream the contest data from one or more remote systems, stream the data to one or more remote systems, and so forth.

The contest application generation 506 may be configured to create a sponsor-specific contest application for use by participant systems 102. For example, the contest application generation module 506 may create a "COCA-COLA" contest application that presents COCA-COLA contests. In some embodiments, the contest application generation module 506 uses rules (e.g., an SDK) provided by one or more remote systems to generate the sponsor-specific application.

The communication module 508 may be configured to send requests to and receive data from one or a plurality of systems. The communication module 508 may send requests to and receive data from a system through a network or a portion of a network. Depending upon implementation-specific or other considerations, the communication module 508 may send requests and receive data through a connection, all or a portion of which may be a wireless connection. The communication module 508 may request and receive messages, and/or other communications from associated systems. Received data may be stored in the datastore 510. In some embodiments, functionality of the communication module 508 may be included in one or more other modules of the sponsor system 104 (e.g., the contest generation module 502, the contest client module 504, or the like).

The participant system datastore 310 may further be configured as buffer or cache. For example, the datastore 510 may store video, contest, participant feedback and/or other input, communications received from other systems, data to be transmitted to other systems, and the like.

Figure 6:
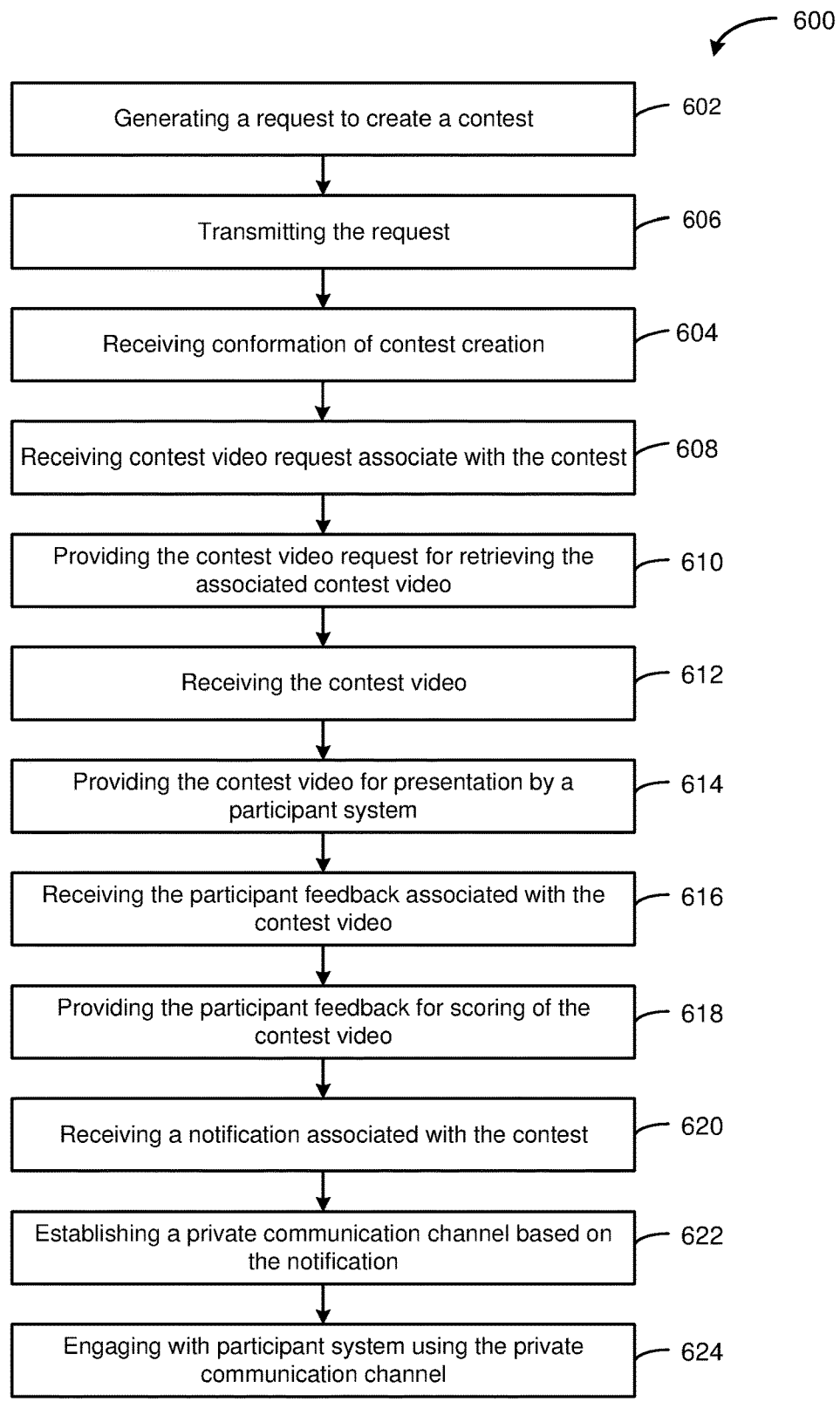
FIG. 6 depicts a flowchart of an example method of operation of a sponsor system according to some embodiments.

FIG. 6 depicts a flowchart 600 of an example method of operation of a sponsor system 104 according to some embodiments.

In step 602, a sponsor system 104 generates a request to create a contest. In some embodiments, a contest generation module generates the request. The request may include contest rules indicating the types of videos to be included in the contest, whether videos or personal information of video creators may be shared, length of videos to be included in the contest, duration of contest, how videos are to be scored, type of feedback allowed, or the like.

In step 604, the sponsor system 104 transmits the contest creation request. In some embodiments, the contest creation module transmits the contest creation request to the contest management system 106.

In step 606, the sponsor system 104 receives confirmation of contest creation. In some embodiments, the contest creation module receives the confirmation.

In step 608, the sponsor system 104 receives a contest video request associated with the contest. In some embodiments, a contest client module receives the contest video request. In some embodiments, the sponsor system 104 may receive a list of contest videos associated with the contest and display all or part of the list to one or more devices (e.g., participant systems 102). The participant systems 102 may select one or more of the contest videos from the list and provide a contest video request (e.g., requesting one or more of the contest videos to view).

In step 610, the sponsor system 104 provides the contest video request for retrieving the contest video. In some embodiments, the contest client module provides the request to the contest management system 106.

In step 612, the sponsor system 104 receives the contest video associated with the contest video request. For example, the sponsor system 104 may stream video data or the complete video data file. In some embodiments, the contest client module receives the contest video.

In step 614, the sponsor system 104 provides the contest video for presentation by a participant system 102. In some embodiments, the contest client module provides the contest video from the contest management system 106.

In step 616, the sponsor system 104 receives participant feedback associated with the contest video. In some embodiments, the contest client module receives the participant feedback from a system (e.g., participant system 102) that viewed the contest video (e.g., the contest video identified by the contest video request).

In step 618, the sponsor system 104 provides the participant feedback for scoring of the contest video. In some embodiments, the contest client module provides the participant feedback to the contest management system 106.

In step 620, the sponsor system 104 receives a notification associated with the second contest. For example, the notification may include the participant system 102 of the contest winner from the contest management system 106. The notification of the contest winner may identify one or more participants who created one or more of the winning contest video(s), information identifying one or more of the winning contest video(s), or both. In some embodiments, the contest client module receives the notification.

In step 622, the sponsor system 104 establishes a private communication channel based on the notification. For example, the sponsor system 104 may establish the private communication channel with the participant system 102 in order to provide rewards, or otherwise initiate an engagement with the participant system 102 (step 624). In some embodiments, the contest client module establishes the private communication channel. In some embodiments, the contest management system 106 provide for communication between participant(s) and the sponsor system 104.

Figure 7:
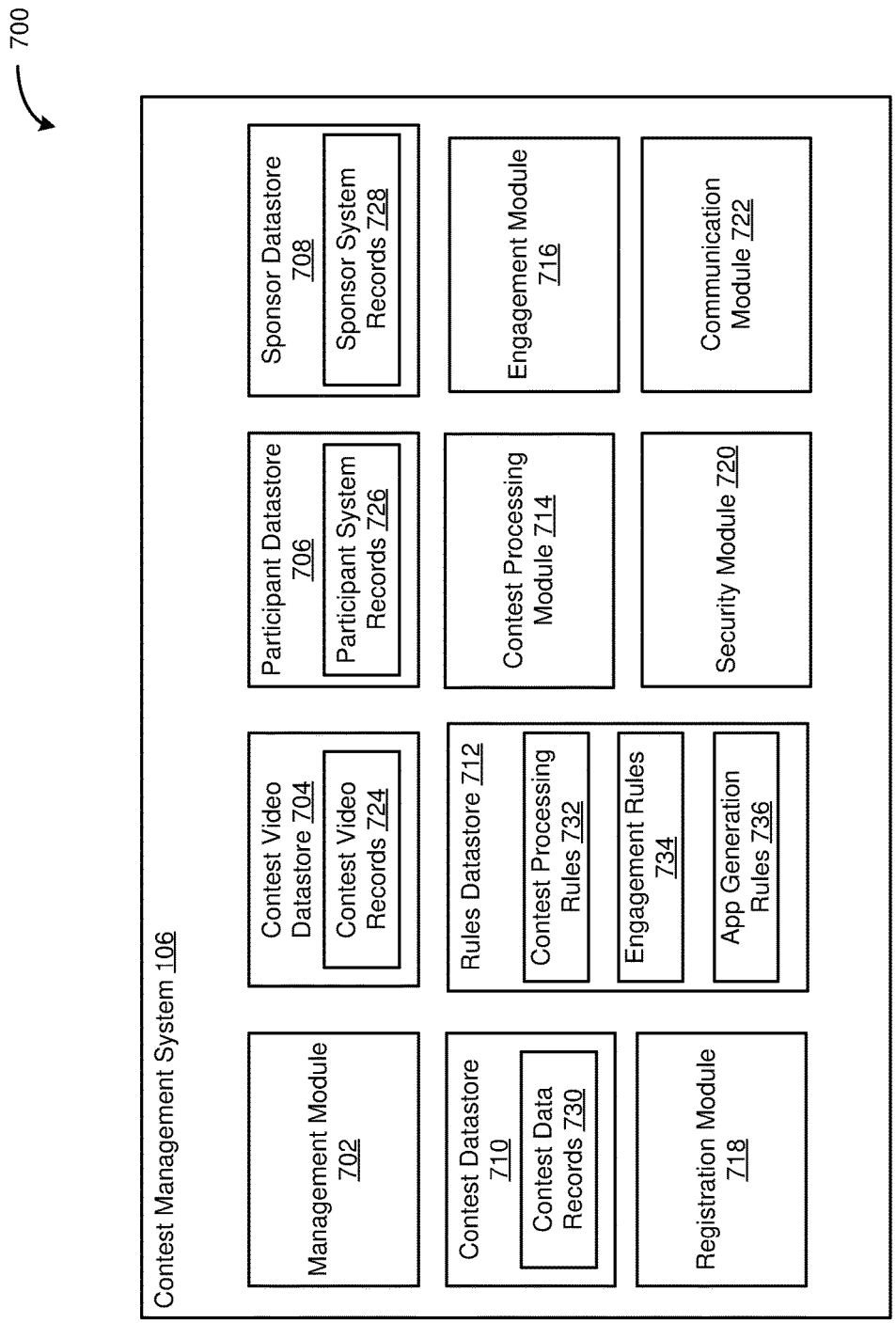
FIG. 7 depicts a block diagram of an example contest management system according to some embodiments.

FIG. 7 depicts a block diagram 700 of an example contest management system 106 according to some embodiments. In some embodiments, the contest management system 106 is configured to store and/or provide contest data, participant data (e.g., participant account information), and sponsor data (e.g., sponsor account information), as well as score contest videos, determine contest results, and the like. The contest management system 106 includes a management module 702, a contest video datastore 704, a participant datastore 706, a sponsor datastore 708, a contest datastore 710, a rules datastore 712, a contest processing module 714, an engagement module 716, a registration module 718, a security module 720, and a communication module 722.

The management module 702 may be configured to manage (e.g., create, read, update, delete, or otherwise access) contest video records 724 stored in the contest video datastore 704, participant system records 726 stored in the participant datastore 706, sponsor system records 728 stored in the sponsor datastore 708, contest data records 730 stored in the contest datastore 710, and rules 732-736 stored in the rules datastore 712. The management module 702 may perform any of these operations manually (e.g., by an administrator interacting with a GUI) and/or automatically (e.g., by one or more of the modules 714-722). In some embodiments, the management module 702 comprises a library of executable instructions which are executable by a processor for performing any of the aforementioned management operations. The datastores 704-712 may be any structure and/or structures suitable for storing the records 724-730 and/or the rules 732-736 (e.g., an active database, a relational database, a table, a matrix, an array, a flat file, and the like). In some embodiments, the functionality of the management module 702 may be included in one or more other modules of the contest management system 106 (e.g., contest processing module 714, engagement module 716, registration module 718, or the like).

In some embodiments, the contest video records 724 may each include a variety of attributes and values associated with a contest video. For example, the contest video records 724 may store some or all of the following data:

Contest Video Identifier: identifies the stored contest video.

Contest Video Name: name of the stored contest video (e.g., "#VC_Barney5"). In some embodiments, a portion of the name (e.g., "#VC") may indicate the linked contest and/or related sponsor system 104. In some embodiments, the contest video name is the contest video identifier.

Contest Video: the video data (e.g., raw or compressed data) for the stored contest video.

Producer: a participant system 102 that generated the contest video

Linked Contest: a contest linked to the stored contest video.

Sponsor: a sponsor system 104 of the linked contest.

Rules: one or more rules (e.g., contest processing rules 732) associated with the contest video.

Permissions: permissions required to access the stored contest. For example, permission may be restricted to participant systems 102 associated with the contest, sponsor systems 104 associated with the contest, administrators, and the like.

Timestamp(s): time/date information for associated CRUD operations performed on the stored video contest record.

In some embodiments, the participant system records 726 may each include a variety of attributes and values associated with a participant system 102. For example, the participant system records 726 may store some or all of the following data:

Participant System Identifier: identifies the stored participant system record.

Participant System Account Information: account information, e.g., username, password, email address, SMS number, phone number, linked social media system accounts, and the like. Some embodiments may have a greater or lesser amount of account information, and/or it may be anonymized, encrypted, and so forth.

Contests: contests associated with the participant system 102.

Contest Videos: contest videos produced by the participant system 102.

Other Attributes: demographic and/or psychographic attributes associated with the participant system 102, e.g., age, gender, location, etc.

Timestamp(s): time/date information for associated CRUD operations performed on the stored participant system record.

In some embodiments, the sponsor system records 728 may each include a variety of attributes and values associated with a sponsor system 104. For example, the sponsor system records 728 may store some or all of the following data:

Sponsor System Identifier: identifies the stored sponsor system record.

Sponsor System Account Information: account information, e.g., username, password, email address, SMS number, phone number, linked social media system accounts, and the like. Some embodiments may have a greater or lesser amount of account information, and/or it may be anonymized, encrypted, and so forth.

Contests: contests associated with the sponsor system 104.

Contest Videos: contest videos associated with the sponsor system 104.

Other Attributes: demographic and/or psychographic attributes associated with the sponsor system, e.g., age, gender, location, etc.

Timestamp(s): time/date information for associated CRUD operations performed on the stored sponsor system record.

In some embodiments, the contest data records 730 may each include a variety of attributes and values associated with a contest. For example, the contest data records 730 may store some or all of the following data:

Contest Identifier: identifies the stored contest.

Contest Name: name of the stored contest.

Contest Type: a type of the stored contest, such as an event (e.g., music event), or topic (e.g., "David Bowie").

Contest Description: a description of the stored contest, such as "show us your best video clip of your 2015 COACHELLA experience."

Contest Rules: one or more rules (e.g., contest rules 732) associated with the stored contest. For example, as discussed further below, the contest rules may define contest parameters (e.g., duration of the contest, contest awards, or the like), and the like.

Contest Sponsor: a sponsor system 104 of the contest.

Contest Participants: contest participants associated with the contest.

Contest Videos: one or more contest videos associated with the contest.

Participant Feedback: the participant feedback associated with the contest. For example, the participant feedback may include the individual participant feedback values (e.g., "up votes," "down votes, etc."). In some embodiments, the participant feedback may also include the participant system 102 that provided the feedback, a time the participant feedback was provided, and/or other attributes associated with the participant system 102 that provided the participant feedback.

Contest Ranking: current and/or historical rankings of the stored contest. For example, the ranking may include a participant system 102 (e.g., account "Jrock5") and a position in the ranking (e.g., first position, second position, last position, or the like) for all or a portion of the participant systems 102 associated with the contest. This may be used to generate a "leaderboard" and/or other gamification features of the contest.

Contest Results: result of the contest, e.g., winners, score values, rankings, etc., and associated participant system attributes (e.g., account name).

Permissions: permissions required to access the stored contest. For example, permission may be restricted to participant systems 102 associated with contest, sponsor systems 104 associated with the contest, administrators, and the like.

Contest Start and End Times: a time the contest was started and a time the contest was terminated.

Timestamp(s): time/date information for associated CRUD operations performed on the stored contest record.

Contest Processing Rules 732

The contest processing rules 732 may define attributes, functions, and/or conditions for creating and operating contests. In some embodiments, the contest processing rules 732 define contest parameters. For example, contest parameters may include contest duration, contest awards, and/or contest access restriction. Contest parameters may include a contest start time and contest end time which define when participant feedback and/or contest videos may be submitted. In some embodiments, the start time and the end may for participant feedback submission and the contest video submissions may be the same or different. Contest awards, for example, may include notifications, goods and/or services. In some embodiments the awards may include "experiential awards," such as training with the USC football team for a day. Contest access restriction, for example, may define the types of participant systems 102 allowed to view contest videos (e.g., any participant system 102), provide contest videos (e.g., only participant systems 102 associated with the contest), and/or provide participant feedback (e.g., only participant systems 102 associated with the contest). The contest processing rules 732, contest rules 734, Engagement Processing Rules 734, or any combination are provided in whole or in part by the sponsor system 104.

In some embodiments, the contest processing rules 732 define attributes, functions, and/or conditions for scoring contest videos. For example, the contest processing rules 732 may assign a numeric value to participant feedback, and tally a sum total (e.g., 100 likes and 50 dislikes would yield a contest video score of 50). In some embodiments, the contest video score may comprise a score vector. For example, the contest video score may be based on multiple factors, such as participant system 102 attributes, along with the numerical value of the associated "like" or "dislike." In some embodiments, one or more of the multiple factors may be weighted relative to one or more of the other factors.

In some embodiments, the contest processing rules 732 define attributes, functions, and/or conditions for determining contest rankings, and generating corresponding structures (e.g., leaderboards). For example, contest rankings and corresponding structure may be based on the contest score calculations associated with the contest videos of the contest.

In some embodiments, the contest processing rules 732 define attributes, functions, and/or conditions for providing and sharing contest videos, e.g., with one or more remote systems (e.g., other participants systems, sponsor systems 104, or social media systems). For example, participant systems 102 may be required to have a registered account and be logged in to submit share requests. In some embodiments, the contest management system 106 may share videos in response to share requests received from participant systems 102 that have a registered account and are logged in.

In some embodiments, the contest processing rules 732 may be configured to generate notifications. For example, a set of threshold conditions may be defined that, when satisfied, trigger a notification. For example, threshold conditions may be defined to trigger notifications for a start of a contest, an end of a contest, a ranking change, and other notifications discussed herein. In some embodiments, the conditions may be predefined, and/or defined by a related sponsor system, e.g., within the contest creation request.

The contest processing module 714 may be configured to execute the contest processing rules 732 to create contests, define and update contest parameters, score contest videos, determine contest ranking and contest results, generate leaderboards, share contest videos, provide notifications, and otherwise provide the functionality required to maintain and operate contests for multiple different sponsors.

Engagement Processing Rules 734

The engagement processing rules 734 may define attributes, functions, and/or conditions for determining engagement levels (or, "engagement scores") of participant systems 102 relative to various sponsor systems 104. For example, participant system 102 activity and interaction with sponsor systems 104 may be tracked (e.g., visiting sponsor system web sites, participating in contests, or the like). In some embodiments, rate of interaction, frequency of interaction, and duration of interaction may be used to calculate engagement levels.

In some embodiments, the engagement processing rules 734 may provide gamification features (e.g., rankings, leaderboards, awards, or the like) related specifically to engagement, e.g., as opposed to contests. For example, the engagement processing rules 734 may provide for tracking activity of participant systems 102, such as a frequency a participant system 102 interacts with a sponsor systems 104, duration of the interactions, and so forth. Awards and notifications may be provided to participant systems 102 based on engagement. For example, threshold conditions may be determined, and a participant system's engagement level may be compared with the condition to determine if any awards or notification are generated. Similarly, changes in engagement level may result in awards and/or notifications. In some embodiments, engagement levels of various participant systems 102 may be compared and/or ranked, and corresponding awards and notifications may be generated accordingly.

The engagement module 716 may be configured to execute the engagement processing rules 734 to determine engagement levels between participant systems 102 and sponsor systems 104, provide notifications and awards based on engagement levels, and provide gamification features (e.g., awards, notifications, rankings, leaderboards, or the like) specific to engagement levels.

Customized Application Generation Rules 736

The customized application generation rules 736 may comprise an SDK that may be used to generate sponsor-specific contest applications (e.g., mobile apps). For example, sponsor-specific applications may increase an engagement level between participant systems 102 and sponsor systems 104, and the customized application generation rules 736 may make such applications more accessible to sponsor systems 104.

The registration module 718 may be configured to create accounts for participant systems 102 and sponsor systems 104, update account information for participant systems 102 and sponsor systems 104, authorize login attempts, and join participant systems 102 to particular contests. It will be appreciated that the accounts are related to the contest management system 106 and the participant systems 102 and sponsor systems 104 (e.g., to create contest videos, provide participant feedback, create contests, or the like), and not accounts of related devices (e.g., to login to an operating system account of devices performing the functionality of the participant systems 102 or sponsor systems 104). In some embodiments, the registration module 718 may link accounts with related social media system accounts. For example, a registered participant system account of the contest management system 106 may be linked to a related Facebook or Twitter account in order to share contest videos.

The security module 720 may be configured to authenticate access to the contest management system 106. For example, the security module 720 may compare permissions of a participant system 102 prior to allowing the participant system 102 to login to the contest management system 106, e.g., to provide participant feedback and create contest videos. In a specific embodiment, the security module 720 may also be configured to secure communications between the contest management system 106 and one or more remote systems, and/or secure communications between one or more remote systems. In some embodiments, the security module 720 provides encryption and decryption functionality, e.g., provided by an operating system (e.g., Windows, Linux, Mac OS), or otherwise (e.g., a custom solution). For example, the security module 720 may encrypt data messages transmitted from the contest management system 106 and decrypt data messages received at the contest management system 106.

The communication module 722 may be configured to send requests to and receive data from one or a plurality of systems. The communication module 722 may send requests to and receive data from a system through a network or a portion of a network. Depending upon implementation-specific or other considerations, the communication module 722 may send requests and receive data through a connection, all or a portion of which may be a wireless connection. The communication module 722 may request and receive messages, and/or other communications from associated systems. In some embodiments, the communication module 722 may be configured to stream data (e.g., contest video and/or other contest data) to one or more other remote systems. In some embodiments, functionality of the communication module 722 may be included in one or more other modules of the contest management system 106 (e.g., the contest processing module 714, engagement module 716, registration module 718, security module 720, or the like).

Figure 8:
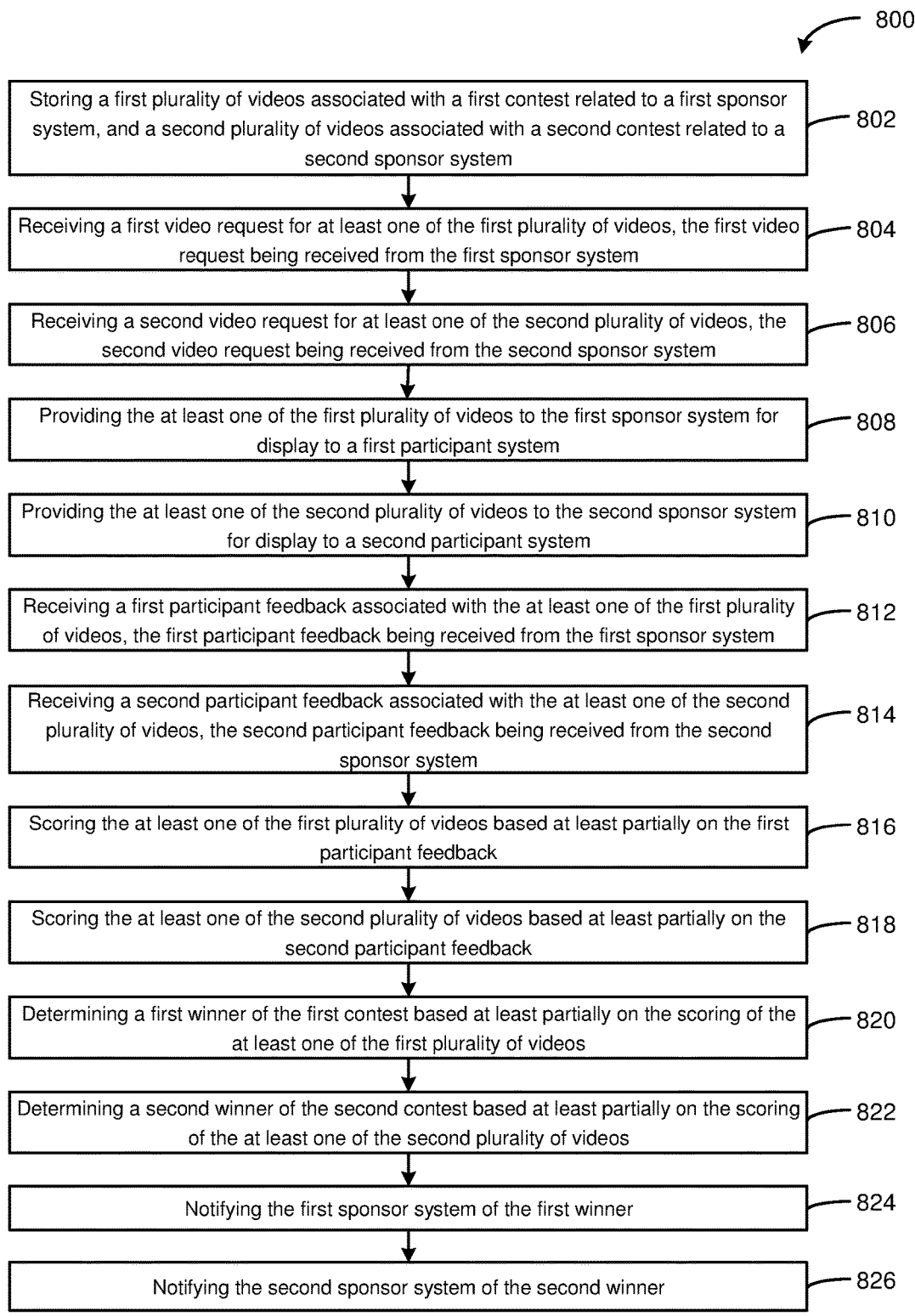
FIG. 8 depicts a flowchart of an example method of operation of a contest management system according to some embodiments.

FIG. 8 depicts a flowchart 800 of an example method of operation of a contest management system 106 according to some embodiments.

In step 802, a contest management system 106 stores a first plurality of videos associated with a first contest related to a first sponsor system 104-1, and a second plurality of videos associated with a second contest related to a second sponsor system 104-2. In some embodiments, a contest video datastore and/or a contest datastore stores the videos.

In step 804, a contest management system 106 receives a first video request for at least one of the first plurality of videos, the first video request being received from the first sponsor system 104-1. In some embodiments, a contest processing module receives the first video request.

In step 806, a contest management system 106 receives a second video request for at least one of the second plurality of videos, the second video request being received from the second sponsor system 104-2. In some embodiments, the contest processing module receives the second video request.

In step 808, a contest management system 106 provides the at least one of the first plurality of videos to the first sponsor system 104-1 for display to a first participant system. In some embodiments, the contest processing module provides the video.

In step 810, a contest management system 106 provides the at least one of the second plurality of videos to the second sponsor system 104-2 for display to a second participant system. In some embodiments, the contest processing module provides the video.

In step 812, a contest management system 106 receives a first participant feedback associated with the at least one of the first plurality of videos, the first participant feedback being received from the first sponsor system 104-1. In some embodiments, the contest processing module receives the first participant feedback.

In step 814, a contest management system 106 receives a second participant feedback associated with the at least one of the second plurality of videos, the second participant feedback being received from the second sponsor system 104-2. In some embodiments, the contest processing module receives the second participant feedback.

In step 816, a contest management system 106 scores the at least one of the first plurality of videos based at least partially on the first participant feedback. In some embodiments, the contest processing module performs the scoring.

In step 818, a contest management system 106 scores the at least one of the second plurality of videos based at least partially on the second participant feedback. In some embodiments, the contest processing module. In some embodiments, the contest processing module performs the scoring.

In step 820, a contest management system 106 determines a first winner of the first contest based at least partially on the scoring of the at least one of the first plurality of videos. In some embodiments, the contest processing module performs the determination.

In step 822, a contest management system 106 determines a second winner of the second contest based at least partially on the scoring of the at least one of the second plurality of videos. In some embodiments, the contest processing module performs the determination.

In step 824, a contest management system 106 notifies the first sponsor system 104-1 of the first winner. In some embodiments, the contest processing module performs the notification.

In step 826, a contest management system 106 notifies the second sponsor system 104-2 of the second winner. In some embodiments, the contest processing module performs the notification.

Figure 9:
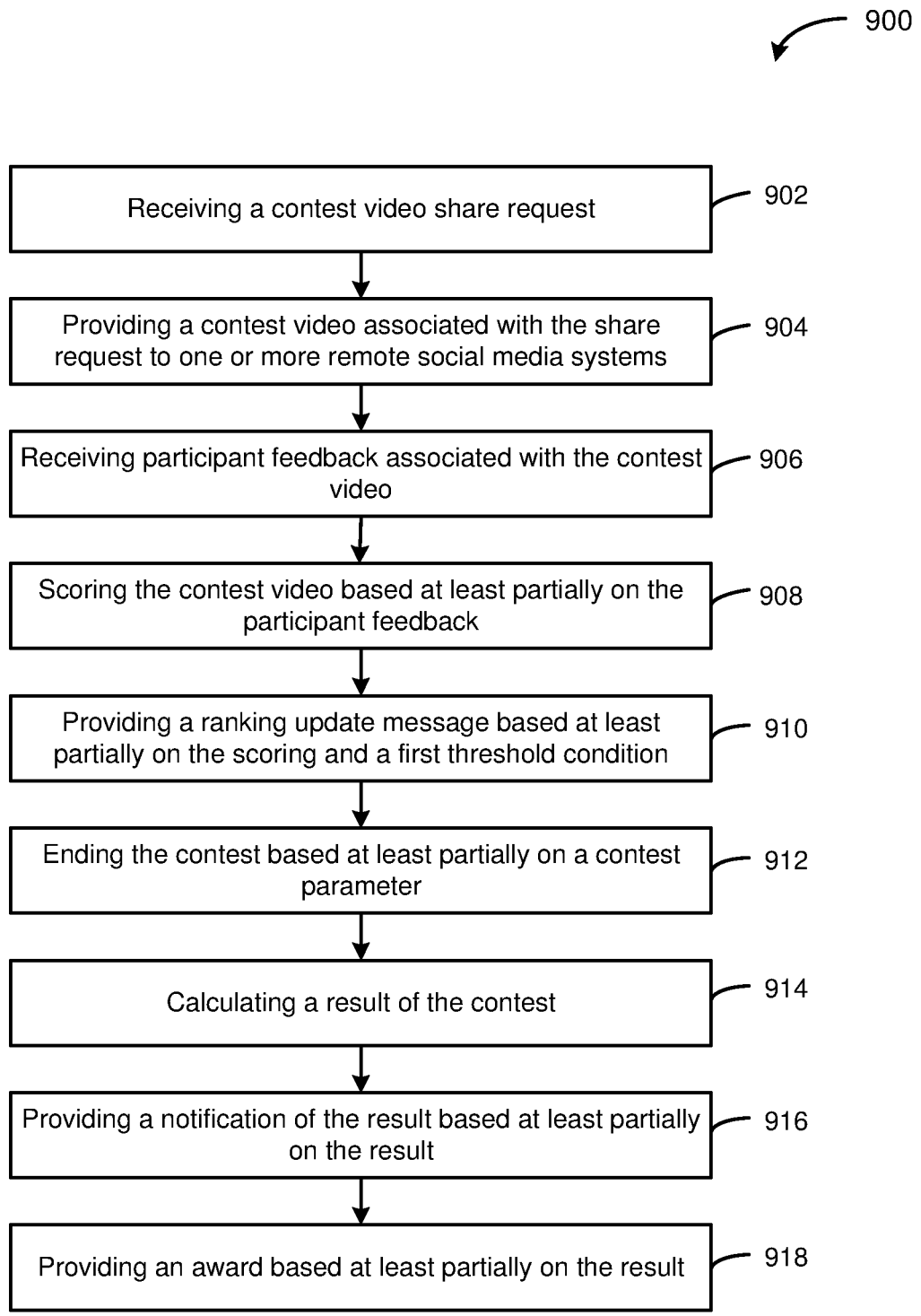
FIG. 9 depicts a flowchart of an example method of operation of a contest management system according to some embodiments.

FIG. 9 depicts a flowchart 900 of an example method of a contest management system 106 according to some embodiments.

In step 902, a contest management system 106 receives a contest video share request. In some embodiments, the contest processing module receives the request.

In step 904, the contest management system 106 provides a contest video associated with the share request to one or more remote social media systems. In some embodiments, the contest processing module provides the contest video.

In step 906, the contest management system 106 receives participant feedback associated with the contest video. In some embodiments, the contest processing module receives the participant feedback.

In step 908, the contest management system 106 scores the contest video based at least partially on the participant feedback. In some embodiments, the contest management system 106 periodically updates contest video scores and/or current contest rankings, e.g., at predetermined intervals. In other embodiments, contest video scores and/or current rankings are updated dynamically, or in real-time, as the participant feedback in received and processed by the contest management system 106. In some embodiments, the contest processing module scores the contest video.

In step 910, the contest management system 106 provides a ranking update message based at least partially on the scoring and a first threshold condition. For example, the threshold condition may comprise a current set of rankings, and if current set of ranking changes in response to the scoring, the contest management system 106 may provide the ranking update message. In some embodiments, the contest processing module provides the message.

In step 912, the contest management system 106 ends the contest based on a first contest parameter. For example, the first parameter may define a contest duration (e.g., 7 days), and the contest management system 106 may trigger a contest end operation based on a start time associated with the contest. In some embodiments, the contest processing module ends the contest.

In step 914, the contest management system 106 calculates a result of the contest. In some embodiments, the contest processing module calculates the result.

In step 916, the contest management system 106 provides a notification of the result. For example, the contest management system 106 may provide a notification based on a threshold condition (e.g., a final ranking relative to the threshold condition, a final score value relative to the threshold condition, or the like). In some embodiments, the contest processing module provides the notification.

In step 918, the contest management system 106 provides an award based at least partially on the result. In some embodiments, the award may be provided based on a threshold condition (e.g., a final ranking relative to the threshold condition, a final score value relative to the threshold condition, or the like).

Figure 10:
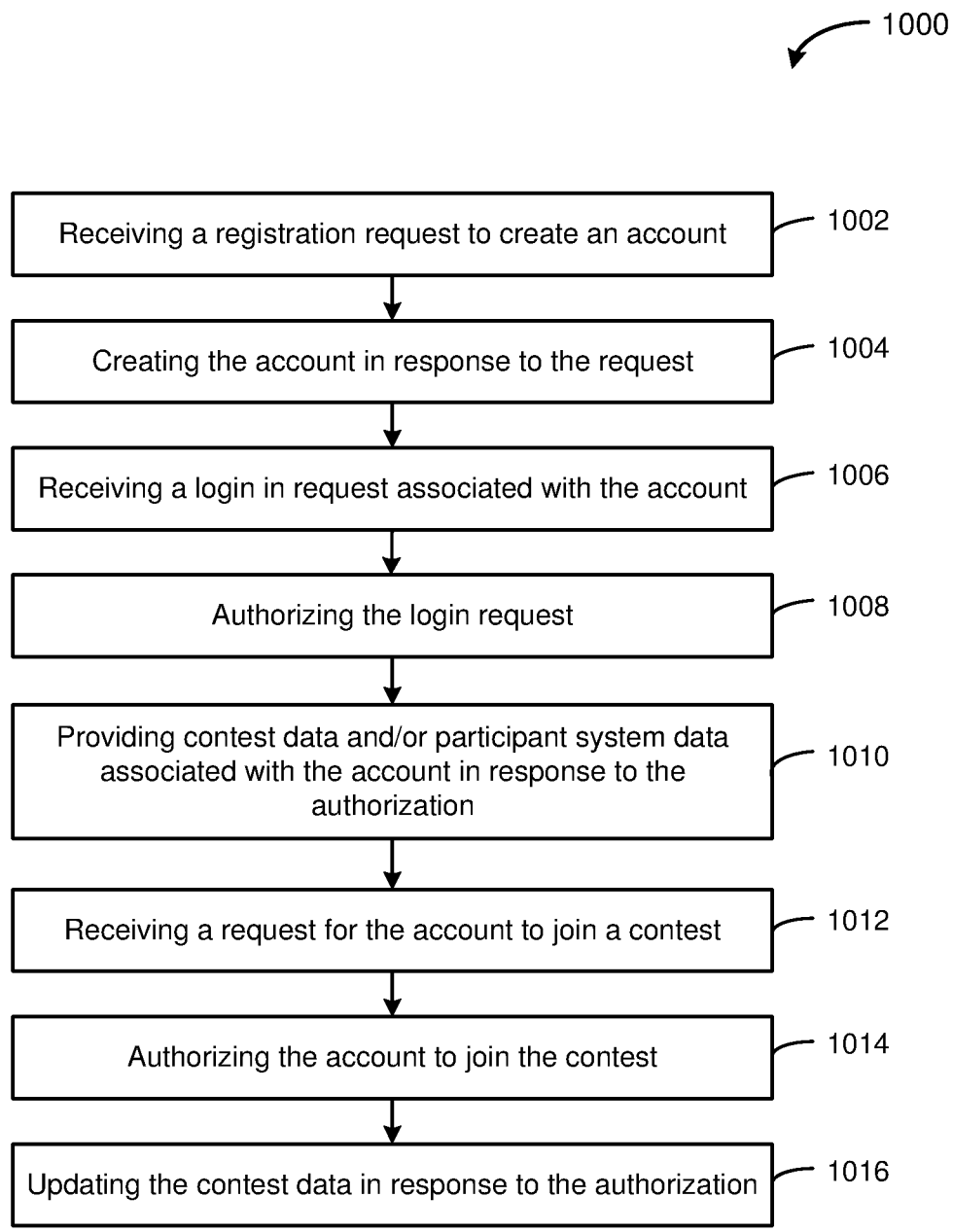
FIG. 10 depicts a flowchart of an example method of registration of a contest management system according to some embodiments.

FIG. 10 depicts a flowchart 900 of an example registration method of a contest management system 106 according to some embodiments.

In step 1002, a contest management system 106 receives a request to register (or, "create") an account with the contest management system 106. In some embodiments, registration may provide access to various features otherwise unavailable. For example, registration may be required to provide participant feedback, create contest videos, and/or share contest videos. In some embodiments, a registration module receives the request.

In step 1004, the contest management system 106 creates an account. In some embodiments, the registration module creates the account.

In step 1006, the contest management system 106 receives an account login request. In some embodiments, a security module receives the account login request.

In step 1008, the contest management system 106 authorizes the account login request. In some embodiments, the security module authorizes the login request.

In step 1010, the contest management system 106 provides contest data and/or participant system data in response to the authorization. In some embodiments, a contest processing module provides the contest data and/or participant system data.

In step 1012, the contest management system 106 receives a request to join a contest. In some embodiments, the registration module receives the request to join a contest.

In step 1014, the contest management system 106 authorizes the request to join the contest. In some embodiments, the registration module authorizes the request to join the contest.

In step 1016, the contest management system 106 updates the contest. In some embodiments, the registration module updates the contest.

Figure 11:
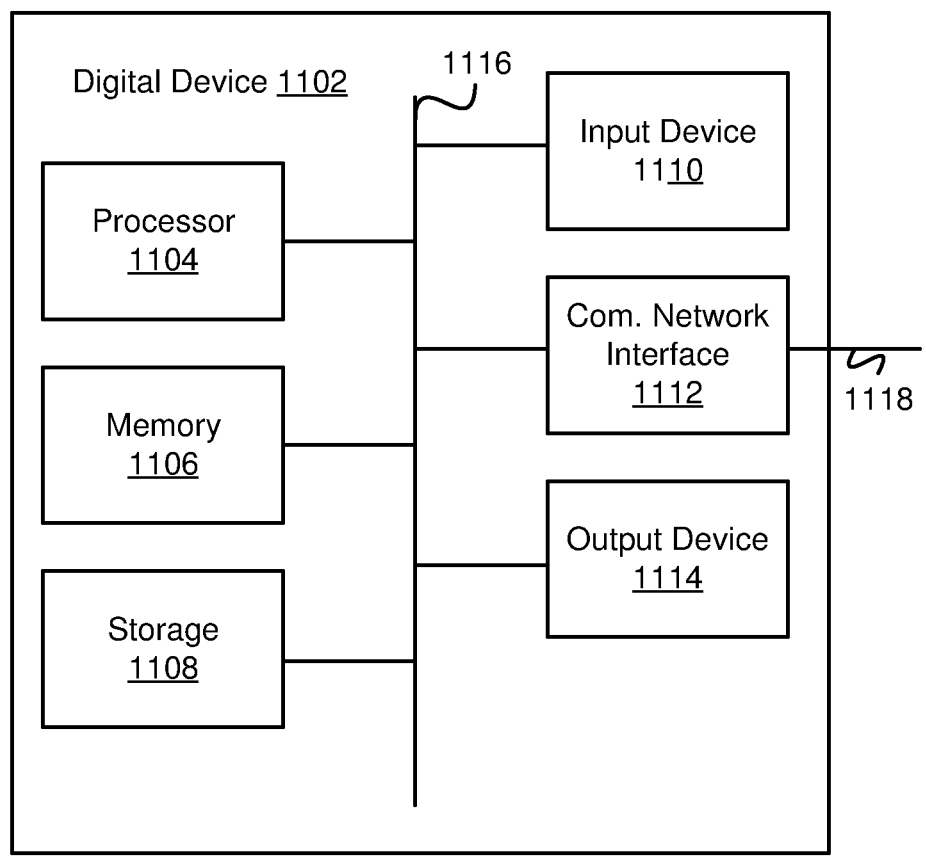
FIG. 11 depicts a block diagram of an example computing device according to some embodiments.

FIG. 11 depicts a block diagram 1100 of a digital device 1102 according to some embodiments. Any of the participant systems 102, the sponsor system 104, the contest management system 106, the social media systems 108, and the communication network may comprise an instance of the digital device 1102. The digital device 1102 comprises a processor 1104, memory 1106, storage 1108, an input device 1110, a communication network interface 1112, and an output device 1114 communicatively coupled to a communication channel 1116. The processor 1104 is configured to execute executable instructions (e.g., programs). In some embodiments, the processor 1104 comprises circuitry or any processor capable of processing the executable instructions.

The memory 1106 stores data. Some examples of memory 1106 include storage devices, such as RAM, ROM, RAM cache, virtual memory, etc. In various embodiments, working data is stored within the memory 1106. The data within the memory 1106 may be cleared or ultimately transferred to the storage 1108.

The storage 1108 includes any storage configured to retrieve and store data. Some examples of the storage 1108 include flash drives, hard drives, optical drives, and/or magnetic tape. Each of the memory system 1106 and the storage system 1108 comprises a computer-readable medium, which stores instructions or programs executable by processor 1104.

The input device 1110 is any device that inputs data (e.g., mouse and keyboard). The output device 1114 outputs data (e.g., a speaker or display). It will be appreciated that the storage 1108, input device 1110, and output device 1114 may be optional. For example, the routers/switchers may comprise the processor 1104 and memory 1106 as well as a device to receive and output data (e.g., the communication network interface 1112 and/or the output device 1114).

The communication network interface 1112 may be coupled to a network (e.g., network 110) via the link 1118. The communication network interface 1112 may support communication over an Ethernet connection, a serial connection, a parallel connection, and/or an ATA connection. The communication network interface 1112 may also support wireless communication (e.g., 1102.11 a/b/g/n, WiMax, LTE, WiFi). It will be apparent that the communication network interface 1112 may support many wired and wireless standards.

It will be appreciated that the hardware elements of the digital device 1102 are not limited to those depicted in FIG. 11. A digital device 1102 may comprise more or less hardware, software and/or firmware components than those depicted (e.g., drivers, operating systems, touch screens, biometric analyzers, or the like). Further, hardware elements may share functionality and still be within various embodiments described herein. In one example, encoding and/or decoding may be performed by the processor 1104 and/or a co-processor located on a GPU (e.g., NVIDIA).

It will be appreciated that a "module," "system," and/or "datastore" may comprise software, hardware, firmware, and/or circuitry. In one example, one or more software programs comprising instructions capable of being executable by a processor may perform one or more of the functions of the modules, datastore, or systems described herein. In another example, circuitry may perform the same or similar functions. Alternative embodiments may comprise more, less, or functionally equivalent modules, systems, or datastore, and still be within the scope of present embodiments. For example, as previously discussed, the functions of the various modules, systems, or datastore may be combined or divided differently.

It will be appreciated that although videos (e.g., contest videos) are described herein, as well as associated structures (e.g., contest video datastore, video records, or the like), other types of content (e.g., pictures, audio, music, or the like), and associated structures, may be provided by the systems and methods described herein. For example, a contest management system may be able to store and score audio content, participant systems 102 may be able to provide feedback on audio content, and so forth.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A method comprising:
storing, by a contest management system, a first plurality of videos associated with a first contest related to a first sponsor system, and a second plurality of videos associated with a second contest related to a second sponsor system, the first sponsor system having a first platform type, and the second sponsor system having a second platform type different from the first platform type;
receiving, by the contest management system, a first video request for at least one of the first plurality of videos, the first video request being received from the first sponsor system;
receiving, by the contest management system, a second video request for at least one of the second plurality of videos, the second video request being received from the second sponsor system;

in response to the first video request from the first sponsor system, providing, by the contest management system, the at least one of the first plurality of videos to the first sponsor system for sending to a first participant system to present the at least one of the first plurality of videos;

in response to the second video request from the second sponsor system, providing, by the contest management system, the at least one of the second plurality of videos to the second sponsor system for sending to a second participant system to present the at least one of the second plurality of videos;

receiving, by the contest management system, a first participant feedback associated with the at least one of the first plurality of videos and provided by the first participant system, the first participant feedback being received from the first sponsor system, the first participant feedback being configured according to the first platform type;

receiving, by the contest management system, a second participant feedback associated with the at least one of the second plurality of videos and provided by the second participant system, the second participant feedback being received from the second sponsor system, the second participant feedback being configured according to the second platform type;

receiving, by the contest management system, a first sharing request for sharing the at least one of the first plurality of videos from a third participant system;

receiving, by the contest management system, a second sharing request for sharing the at least one of the second plurality of videos from a fourth participant system;

in response to the first sharing request from the third participant system, sharing the at least one of the first plurality of videos with a social media system;

in response to the second sharing request from the fourth participant system, sharing the at least one of the second plurality of videos with the social media system;

receiving, by the contest management system, a third participant feedback associated with the at least one of the first plurality of videos from the social media system based on a first attribute of the at least one of the first plurality of videos;

receiving, by the contest management system, a fourth participant feedback associated with the at least one of the second plurality of videos from the social media system based on a second attribute of the at least one of the second plurality of videos;

scoring, by the contest management system, the at least one of the first plurality of videos based at least partially on the first participant feedback and the third participant feedback;

scoring, by the contest management system, the at least one of the second plurality of videos based at least partially on the second participant feedback and the fourth participant feedback;

determining, by the contest management system, a first winner of the first contest based at least partially on the scoring of the at least one of the first plurality of videos;

determining, by the contest management system, a second winner of the second contest based at least partially on the scoring of the at least one of the second plurality of videos;

notifying, by the contest management system, the first sponsor system of the first winner; and notifying, by the contest management system, the second sponsor system of the second winner.

2. The method of claim 1, wherein the first sponsor system and the second sponsor system comprise different computing systems operating at different network sites.

3. The method of claim 1, wherein the first participant system and the second participant system comprise different computing systems operating at different network sites.

4. The method of claim 1, wherein the first participant feedback comprises first participant feedback generated by a third participant system.

5. The method of claim 4, wherein the second participant feedback comprises second participant feedback generated by a fourth participant system.

6. The method of claim 1, further comprising:
determining, by the contest management system, a third participant system associated with the first winner; and
providing, by the contest management system, a first notification to the third participant system, the first notification indicating a first result of the first contest.

7. The method of claim 6, further comprising:
determining, by the contest management system, a fourth participant system associated with the second winner; and
providing, by the contest management system, a second notification to the fourth participant system, the second notification indicating a second result of the second contest.

8. The method of claim 1, wherein the providing the at least one of the first plurality of videos to the first sponsor system for display to the first participant system comprises streaming the at least one of the first plurality of videos to the first sponsor system for display to the first participant system.

9. The method of claim 8, wherein the providing the at least one of the second plurality of videos to the second sponsor system for display to the second participant system comprises streaming the at least one of the second plurality of videos to the second sponsor system for display to the second participant system streaming.

10. A system, comprising:
a processor;
a contest video datastore configured to cooperate with the processor to store a first plurality of videos associated with a first contest related to a first sponsor system, and a second plurality of videos associated with a second contest related to a second sponsor system, the first sponsor system having a first platform type, and the second sponsor system having a second platform type different from the first platform type; and
memory including executable instructions that are executable by the processor to control the processor to:
receive a first video request for at least one of the first plurality of videos, the first video request being received from the first sponsor system;
receive a second video request for at least one of the second plurality of videos, the second video request being received from the second sponsor system;
in response to the first video request from the first sponsor system, provide the at least one of the first plurality of videos to the first sponsor system for sending to a first participant system to present the at least one of the first plurality of videos;
in response to the second video request from the second sponsor system, provide the at least one of the second plurality of videos to the second sponsor system for sending to a second participant system to present the at least one of the second plurality of videos;

receive a first participant feedback associated with the at least one of the first plurality of videos and provided by the first participant system, the first participant feedback being received from the first sponsor system, the first participant feedback being configured according to the first platform type;

receive a second participant feedback associated with the at least one of the second plurality of videos and provided by the second participant system, the second participant feedback being received from the second sponsor system, the second participant feedback being configured according to the second platform type;

receive, by the contest management system, a first sharing request for sharing the at least one of the first plurality of videos from a third participant system;

receive, by the contest management system, a second sharing request for sharing the at least one of the second plurality of videos from a fourth participant system;

in response to the first sharing request from the third participant system, share the at least one of the first plurality of videos with a social media system.

in response to the second sharing request from the fourth participant system, share the at least one of the second plurality of videos with the social media system;

receive, by the contest management system, a third participant feedback associated with the at least one of the first plurality of videos from the social media system based on a first attribute of the at least one of the first plurality of videos;

receive, by the contest management system, a fourth participant feedback associated with the at least one of the second plurality of videos from the social media system based on a second attribute of the at least one of the second plurality of videos;

score the at least one of the first plurality of videos based at least partially on the first participant feedback and the third participant feedback;

score the at least one of the second plurality of videos based at least partially on the second participant feedback and the fourth participant feedback;

determine a first winner of the first contest based at least partially on the scoring of the at least one of the first plurality of videos;

determine a second winner of the second contest based at least partially on the scoring of the at least one of the second plurality of videos;

notify the first sponsor system of the first winner; and notify the second sponsor system of the second winner.

11. The system of claim 10, wherein the first sponsor system and the second sponsor system comprise different computing systems operating at different network sites.

12. The system of claim 10, wherein the first participant system and the second participant system comprise different computing systems operating at different network sites.

13. The system of claim 10, wherein the first participant feedback comprises first participant feedback generated by a third participant system.

14. The system of claim 13, wherein the second participant feedback comprises second participant feedback generated by a fourth participant system.

15. The system of claim 10, wherein the executable instructions further control the processor to:
determine a third participant system associated with the first winner; and
provide a first notification to the third participant system, the first notification indicating a first result of the first contest.

16. The system of claim 15, wherein the executable instructions further control the processor to:
determine a fourth participant system associated with the second winner; and
provide a second notification to the fourth participant system, the second notification indicating a second result of the second contest.

17. The system of claim 10, wherein the providing the at least one of the first plurality of videos to the first sponsor system for display to the first participant system comprises streaming the at least one of the first plurality of videos to the first sponsor system for display to the first participant system.

18. The system of claim 17, wherein the providing the at least one of the second plurality of videos to the second sponsor system for display to the second participant system comprises streaming the at least one of the second plurality of videos to the second sponsor system for display to the second participant system.

19. A non-transitory computer readable medium comprising executable instructions, the instructions being executable by a processor to perform a method, the method comprising:
storing, by a contest management system, a first plurality of videos associated with a first contest related to a first sponsor system, and a second plurality of videos associated with a second contest related to a second sponsor system, the first sponsor system having a first platform type, and the second sponsor system having a second platform type different from the first platform type;

receiving, by the contest management system, a first video request for at least one of the first plurality of videos, the first video request being received from the first sponsor system;

receiving, by the contest management system, a second video request for at least one of the second plurality of videos, the second video request being received from the second sponsor system;

in response to the first video request from the first sponsor system, providing, by the contest management system, the at least one of the first plurality of videos to the first sponsor system for sending to a first participant system to present the at least one of the first plurality of videos;

in response to the second video request from the second sponsor system, providing, by the contest management system, the at least one of the second plurality of videos to the second sponsor system for sending to a second participant system to present the at least one of the second plurality of videos;

receiving, by the contest management system, a first participant feedback associated with the at least one of the first plurality of videos and provided by the first participant system, the first participant feedback being received from the first sponsor system, the first participant feedback being configured according to the first platform type;

receiving, by the contest management system, a second participant feedback associated with the at least one of the second plurality of videos and provided by the second participant system, the second participant feedback being received from the second sponsor system, the second participant feedback being configured according to the second platform type;

receiving, by the contest management system, a first sharing request for sharing the at least one of the first plurality of videos from a third participant system;

receiving, by the contest management system, a second sharing request for sharing the at least one of the second plurality of videos from a fourth participant system;

in response to the first sharing request from the third participant system, sharing the at least one of the first plurality of videos with a social media system;

in response to the second sharing request from the fourth participant system, sharing the at least one of the second plurality of videos with the social media system;

receiving, by the contest management system, a third participant feedback associated with the at least one of the first plurality of videos from the social media system based on a first attribute of the at least one of the first plurality of videos;

receiving, by the contest management system, a fourth participant feedback associated with the at least one of the second plurality of videos from the social media system based on a second attribute of the at least one of the second plurality of videos;

scoring, by the contest management system, the at least one of the first plurality of videos based at least partially on the first participant feedback and the third participant feedback;

scoring, by the contest management system, the at least one of the second plurality of videos based at least partially on the second participant feedback and the fourth participant feedback;

determining, by the contest management system, a first winner of the first contest based at least partially on the scoring of the at least one of the first plurality of videos;

determining, by the contest management system, a second winner of the second contest based at least partially on the scoring of the at least one of the second plurality of videos;

notifying, by the contest management system, the first sponsor system of the first winner; and notifying, by the contest management system, the second sponsor system of the second winner.

\* \* \* \* \*